(12) United States Patent
Ogura et al.

(10) Patent No.: US 7,569,654 B2
(45) Date of Patent: Aug. 4, 2009

(54) EPOXY RESIN COMPOSITION, PROCESS FOR PRODUCING EPOXY RESIN, NOVEL EPOXY RESIN, NOVEL PHENOL RESIN

(75) Inventors: Ichiro Ogura, Ichihara (JP); Nobuya Nakamura, Ichihara (JP); Tomoyuki Imada, Ichihara (JP)

(73) Assignee: DIC Corporation, Tokyo (JP)

( * ) Notice: Subject to any disclaimer, the term of this patent is extended or adjusted under 35 U.S.C. 154(b) by 364 days.

(21) Appl. No.: 11/454,911

(22) Filed: Jun. 19, 2006

(65) Prior Publication Data

US 2006/0247392 A1    Nov. 2, 2006

Related U.S. Application Data

(62) Division of application No. 10/682,920, filed on Oct. 14, 2003, now Pat. No. 7,087,702.

(30) Foreign Application Priority Data

Oct. 15, 2002   (JP)   ............ P2002-300212

(51) Int. Cl.
*C08L 63/00*   (2006.01)
*C08G 59/00*   (2006.01)
*C08G 59/06*   (2006.01)

(52) U.S. Cl. .............. 528/106; 528/87; 528/393; 528/421

(58) Field of Classification Search .............. None
See application file for complete search history.

(56) References Cited

U.S. PATENT DOCUMENTS

| 4,285,381 A | 8/1981 | Furukawa et al. ........... 152/362 |
| 5,036,112 A | 7/1991 | Dougherty et al. |
| 5,330,675 A | 7/1994 | Kroner et al. ............... 510/475 |
| 5,344,856 A | 9/1994 | Klein |
| 5,374,681 A | 12/1994 | Kroner et al. ................. 525/79 |
| 5,414,053 A | 5/1995 | Volkmann et al. |
| 5,466,762 A | 11/1995 | Kroner et al. ............... 510/220 |
| 5,540,663 A | 7/1996 | Kroner et al. |
| 6,242,533 B1 | 6/2001 | Kurimoto et al. ........... 525/135 |
| 6,887,737 B1 | 5/2005 | Woods et al. ............... 438/106 |

FOREIGN PATENT DOCUMENTS

| EP | 0 491 550 A2 | 6/1992 |
| EP | 0 519 376 A2 | 12/1992 |
| FR | 2 346 382 | 10/1977 |
| JP | 58-001591 | 1/1983 |
| JP | 2001-172494 | 6/2001 |
| SU | 767104 B * | 9/1980 |

OTHER PUBLICATIONS

Derwent abstract of SU 767104 B (1981).*
Japanese Unexamined Patent Application, First Publication (Kokai), No. Hei 8-53533, published on Feb. 27, 1996. (See p. 2 of present specification).
Japanese Unexamined Patent Application, First Publication (Kokai), No. 2001-240654, published on Sep. 4, 2001. (See p. 2 of present specification).

* cited by examiner

*Primary Examiner*—Michael J Feely
(74) *Attorney, Agent, or Firm*—Edwards Angell Palmer & Dodge LLP

(57) ABSTRACT

In the technical field where a difunctional epoxy resin having increased molecular weight is used to impart flexibility or improving dielectric properties, the present invention has remarkably improved moisture resistance and water resistance when used to produce a cured epoxy resin article. The epoxy resin composition comprises a difunctional epoxy resin (A) having a structure wherein an aromatic hydrocarbon group (a1) having a bonding site in an aromatic nucleus and a hydrocarbon group (a2) having an ether bond or the other hydrocarbon group (a3) are bonded via an acetal bond (a4), and also has a structure wherein a glycidyloxy group is bonded to the aromatic hydrocarbon group (a1); and a curing agent (B) as essential component.

8 Claims, 6 Drawing Sheets

EPOXY RESIN COMPOSITION, PROCESS FOR PRODUCING EPOXY RESIN, NOVEL EPOXY RESIN, NOVEL PHENOL RESIN

CROSS REFERENCE TO RELATED APPLICATION

This application is a divisional application of U.S. application Ser. No. 10/682,920 (now U.S. Pat. No. 7,087,702), filed Oct. 14, 2003, now U.S. Pat. No. 7,087,702 and claims the right of priority under 35 U.S.C. § 119 based on Japanese Patent Application No. 2002-300212 filed on Oct. 15, 2002, which is hereby incorporated by reference herein in its entirety as if fully set forth herein.

BACKGROUND OF THE INVENTION

1. Field of the Invention

The present invention relates to an epoxy resin composition which exhibits excellent moisture resistance in a cured article, a process for producing an epoxy resin used in the composition, a novel epoxy resin, and a novel phenol resin which is an intermediate of the novel epoxy resin.

Priority is claimed on Japanese Patent Application No. 2002-300212, filed Oct. 15, 2002, the content of which is incorporated herein by reference.

2. Description of Related Art

Epoxy resins are widely used in the fields of electronics and coatings with high levels of functionality because cured articles thereof obtained by curing with various curing agents are excellent in dimensional stability, electrical insulating properties and chemical resistance. In the field of these epoxy resins, attempts of reducing the density of crosslinks of a cured article are made by using a high-molecular weight difunctional epoxy resin for the purpose of imparting flexibility to the cured article or improving dielectric properties dielectric properties in the fields of electrical and electronic components.

In applications such as underfill materials in the field of semiconductor encapsulant and flexible wiring boards in the field of electrical laminates, which have recently been much in demand, there is required an epoxy resin which can produce cured articles which are flexible and excellent in toughness. As an epoxy resin having these required characteristics, for example, there is known an epoxy resin having increased molecular weight obtained by reacting a liquid bisphenol A type epoxy resin with an aliphatic dicarboxylic acid such as dimer acid or sebacic acid as a molecular chain extender (see, for example, Japanese Unexamined Patent Application, First Publication No. Hei 8-53533 (pages 2 to 4)). However, the epoxy resin obtained by this technique is likely to be hydrolyzed and is inferior in moisture or water resistance due to an ester bond existing in the molecular structure.

As a technique which improves dielectric properties by reducing the density of crosslinks by way of increasing a molecular weight of an epoxy resin in applications such as semiconductor encapsulant, for example, there is known a technique of introducing alicyclic structure in the chemical structure of an epoxy resin. For example, an epoxy resin which is given by glycidyl etherification of a phenol resin, which is a polyadduct of phenol and dicyclopentadiene, is known as an epoxy resin having improved dielectric properties for semiconductor encapsulant (see, for example, Japanese Unexamined Patent Application, First Publication No. 2001-240654 (claim 1, paragraph number [0009])).

Such an epoxy resin is excellent in moisture resistance and dielectric properties and is a useful resin because it can lower a dielectric dissipation, but it is not sufficient in the effect of lowering the dielectric constant and it is difficult to apply the epoxy resin to a semiconductor of a high frequency type in the gigahertz range, which has recently been much in demand. Therefore, even if the epoxy resin having an alicyclic structure in its chemical structure which is caused by, for example, polyadduct of phenol and dicyclopentadiene, in order to further improve dielectric properties dielectric properties such as low dielectric constant and low dielectric dissipation factor of the epoxy resin, the viscosity increases and drastic deterioration of moisture resistance and water resistance is caused by the reaction between an epoxy group and a phenolic hydroxyl group, thereby deteriorating solder cracking resistance.

BRIEF SUMMARY OF THE INVENTION

Therefore, an object to be achieved by the present invention is to remarkably improve moisture resistance of the epoxy resin in the technical field where a difunctional epoxy resin having increased molecular weight is used for the purpose of imparting flexibility or improving dielectric properties dielectric properties.

To achieve the above object, the present inventors have intensively researched and found that a molecular weight of a difunctional epoxy resin can be increased by using a difunctional phenol resin, which is obtained by the acetalization reaction of a divinyl ether of an aliphatic or aromatic hydrocarbon compound or a divinyl ether of an oxyalkylene compound with a difunctional phenol, as a raw material for epoxy resin without deteriorating moisture resistance or water resistance of the epoxy resin. Thus, the present invention has been completed.

That is, the present invention relates to an epoxy resin composition comprising: a difunctional epoxy resin (A) having a structure wherein an aromatic hydrocarbon group (a1) having a bonding site in an aromatic nucleus and a hydrocarbon group (a2) having an ether bond or the other hydrocarbon group (a3) are bonded via an acetal bond (a4), and also has a structure wherein a glycidyloxy group is bonded to the aromatic hydrocarbon group (a1); and a curing agent (B).

Furthermore, the present invention relates to a process for producing an epoxy resin, which comprises the steps of: reacting a difunctional phenol compound (a1') with a divinyl ether (a2') of a hydrocarbon compound having an ether bond or a divinyl ether (a3') of the other hydrocarbon compound, and reacting the resulting phenol compound with epihalohydrin.

Furthermore, the present invention relates to a novel epoxy resin represented by the following general formula 1:

General Formula 1

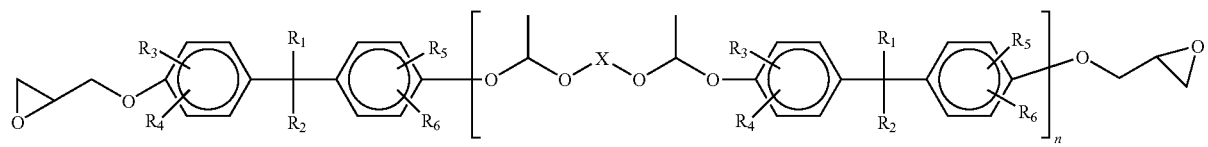

wherein $R_1$ and $R_2$ each represents a hydrogen atom or a methyl group, $R_3$ to R6 each represents a hydrogen atom, a methyl group, a chlorine atom, or a bromine atom, X represents an ethyleneoxyethyl group, a di(ethyleneoxy)ethyl group, a tri(ethyleneoxy)ethyl group, a propyleneoxypropyl group, a di(propyleneoxy)propyl group, a tri(propyleneoxy) propyl group, or an alkylene group having 2 to 15 carbon atoms, n is a natural number, and the average thereof is from 1.2 to 5.

Furthermore, the present invention relates to a novel epoxy resin represented by the following general formula 2:

General Formula 2

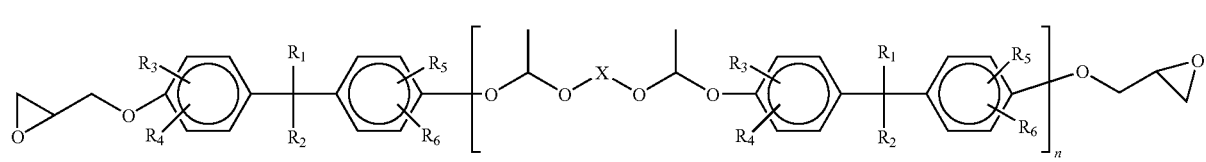

wherein $R_1$ and $R_2$ each represents a hydrogen atom or a methyl group, $R_3$ to $R_6$ each represents a hydrogen atom, a methyl group, a chlorine atom, or a bromine atom, X represents a $C_{6-17}$ aliphatic hydrocarbon group having a cycloalkane skeleton, n is a natural number, and the average thereof is from 1.2 to 5.

Furthermore, the present invention relates to a novel epoxy resin represented by the following general formula 3:

General Formula 3

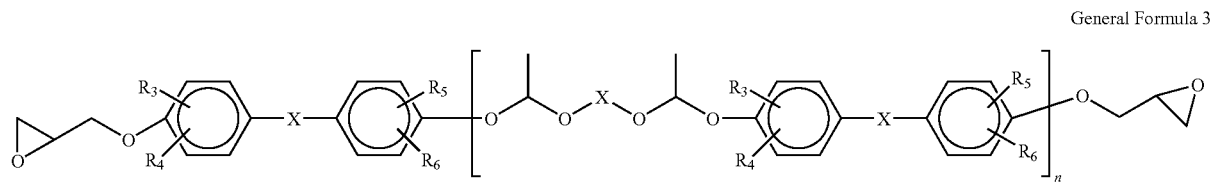

wherein $R_3$ to R6 each represents a hydrogen atom, a methyl group, a chlorine atom, or a bromine atom, X each independently represents a $C_{6-17}$ aliphatic hydrocarbon group having a cycloalkane skeleton, n is a natural number, and the average thereof is from 1.2 to 5.

Furthermore, the present invention relates to a novel phenol resin represented by the following general formula 4:

wherein $R_1$ and $R_2$ each represents a hydrogen atom or a methyl group, $R_3$ to $R_6$ each represents a hydrogen atom, a methyl group, a chlorine atom, or a bromine atom, and X represents an ethyleneoxyethyl group, a di(ethyleneoxy)ethyl group, a tri(ethyleneoxy)ethyl group, a propyleneoxypropyl group, a di(propyleneoxy)propyl group, a tri(propyleneoxy) propyl group, or an alkylene group having 2 to 15 carbon atoms, n is a natural number, and the average thereof is from 1.2 to 5.

Furthermore, the present invention relates to a novel phenol resin represented by the following general formula 5:

General Formula 4

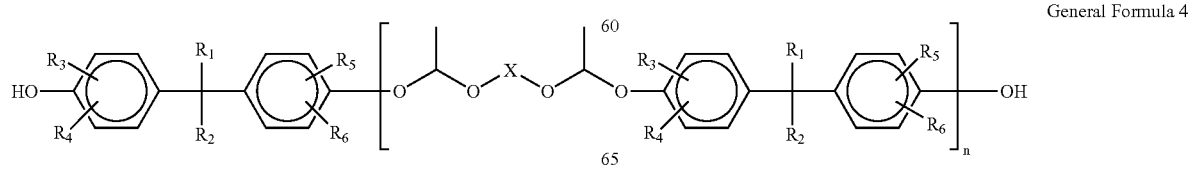

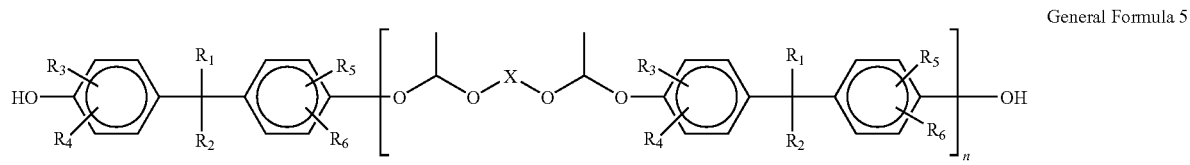

General Formula 5 wherein $R_1$ and $R_2$ each represents a hydrogen atom or a methyl group, $R_3$ to $R_6$ each represents a hydrogen atom, a methyl group, a chlorine atom, or a bromine atom, X represents a $C_{6-17}$ aliphatic hydrocarbon group having a cycloalkane skeleton, n is a natural number, and the average thereof is from 1.2 to 5.

Furthermore, the present invention relates to a novel phenol resin represented by the following general formula 6:

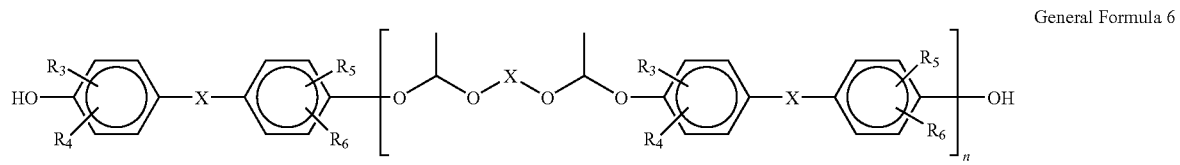

General Formula 6 wherein $R_3$ to $R_6$ each represents a hydrogen atom, a methyl group, a chlorine atom, or a halogen atom, X each independently represents a $C_{6-17}$ aliphatic hydrocarbon group having a cycloalkane skeleton, n is a natural number, and the average thereof is from 1.2 to 5.

According to the present invention, in a high-molecular weight epoxy resin, water resistance and moisture resistance of its cured article are remarkably improved.

The epoxy resin composition of the present invention can be used in coatings because it has flexibility and toughness when using a flexible difunctional epoxy resin (A). In this case, a coating film having excellent adhesion and bending properties is obtained. The epoxy resin can be used in structural materials such as CFRP (carbon fibre reinforced plastics) because of toughness. Furthermore, the epoxy resin can be used in materials such as underfill materials, adhesives for flexible wiring boards, and resist ink materials.

When using a low dielectric difunctional epoxy resin (A), the epoxy resin can be used in materials having low dielectric constant and low dielectric dissipation factor, capable of coping with high-frequency equipment, semiconductor encapsulant, printed circuit board materials and build-up layer insulating materials.

DETAILED DESCRIPTION OF THE INVENTION

Figure 1:
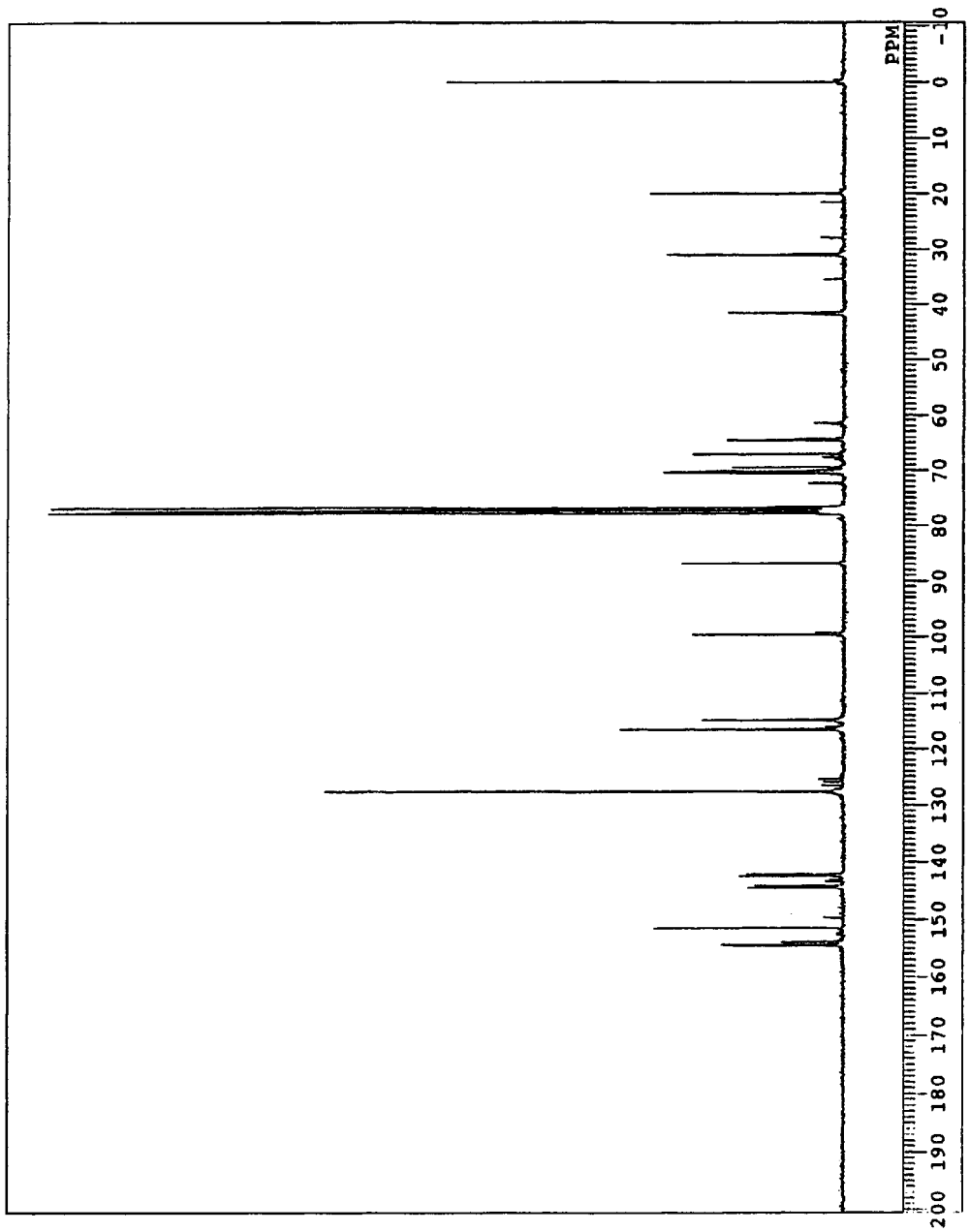
FIG. 1 is a graph showing a $^{13}C$ NMR spectrum of modified polyhydric phenols (ph-1a) obtained in Example 1.

The present invention will be described in detail below.

The difunctional epoxy resin (A) used in the present invention has a structure wherein an aromatic hydrocarbon group (a1) having a bonding site in an aromatic nucleus and a hydrocarbon group (a2) having an ether bond or the other hydrocarbon group (a3) are bonded via an acetal bond (a4), and also has a structure wherein a glycidyloxy group is bonded to the aromatic hydrocarbon group (a1)

The aromatic hydrocarbon group (a1) having a bonding site in an aromatic nucleus is a hydrocarbon group having a bonding site with the other structural unit in the aromatic nucleus in an aromatic hydrocarbon compound. Specific examples of the aromatic hydrocarbon group (a1) include:

(i) a hydrocarbon group having a structure of having only a benzene ring, (ii) a hydrocarbon group having a structure wherein a benzene ring is bonded via a single bond, (iii) a hydrocarbon group having a structure wherein a benzene ring is bonded via a benzene ring is bonded via an aliphatic carbon atom, (iv) a hydrocarbon group having a structure wherein a benzene ring is bonded via an aliphatic cyclic hydrocarbon group, (v) a hydrocarbon group having a structure wherein plural benzene rings are condensed into a polycycle structure, and (vi) a hydrocarbon group having a structure wherein a benzene ring is bonded via an aralkyl group.

Examples of the aromatic hydrocarbon group (i) include a phenylene group having a bonding site at the o-, m-, and p-position.

Examples of the aromatic hydrocarbon group (ii) include 4,4'-biphenylene group and 2,2',6,6'-tetramethyl-4,4'-biphenyl group.

Examples of the aromatic hydrocarbon group (iii) include methylenediphenylene group, 2,2-propane-diphenyl group, and those represented by the following structural formulas:

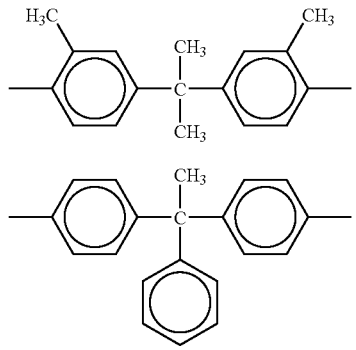

iii-1 iii-2 iii-3

Examples of the aromatic hydrocarbon group (iv) include those represented by the following structural formulas:

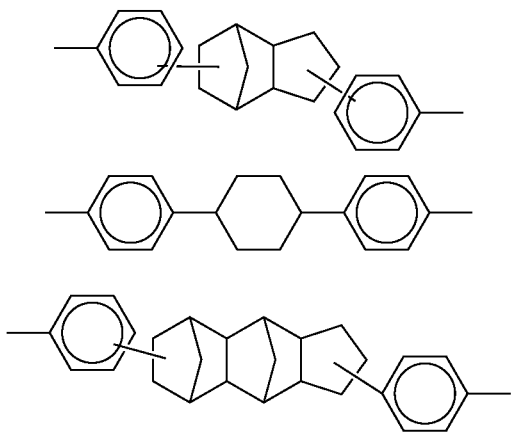

iv-1 iv-2 iv-3

(Here, Bond-positions in the structure iv-1, and iv-3 are located independently on secondary carbon atoms which belong to ethylene or propylene consisting the aliphatic rings in the structures.)

Examples of the aromatic hydrocarbon group (v) include naphthalene groups such as 1,6-naphthalene group and 2,7-naphthalene group, 1,4-naphthalene group, 1,5-naphthalene group, 2,3-naphthalene group, and those represented by the following structure:

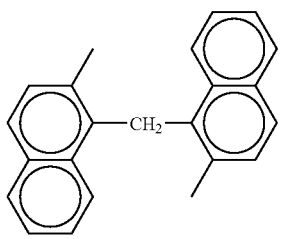

v-1

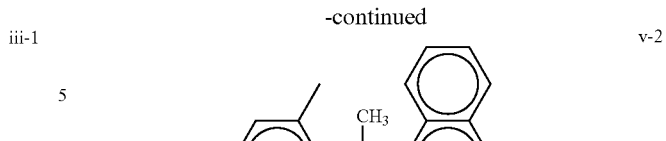

v-2

Examples of the aromatic hydrocarbon group (vi) include those represented by the following structure:

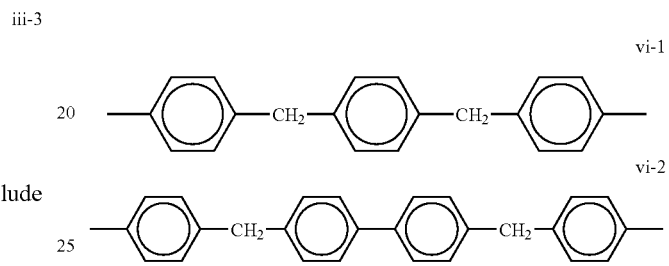

vi-1 vi-2

Among these, an aromatic hydrocarbon group represented by the structure (iii) is preferable and a methylenediphenylene group and a 2,2-propane-diphenyl group are particularly preferable because the resulting cured epoxy resin article is excellent in balance between flexibility and toughness.

According to applications of the difunctional epoxy resin (A), a chemical structure of the hydrocarbon group (a2) having an ether bond or the other hydrocarbon group (a3) can be appropriately selected.

Since a cured epoxy resin article, which is flexible and is excellent in toughness, is required in applications such as underfill materials in the field of semiconductor encapsulant semiconductor encapsulantsemiconductor encapsulant and flexible wiring boards in the field of electrical laminates, it is preferable that an alkyleneoxyalkylene group (a2-1) be selected as the hydrocarbon group (a2) having an ether bond and a straight-chain alkylene group (a3-1) having 2 to 15 carbon atoms be selected as the other hydrocarbon group (a3) (hereinafter a difunctional epoxy resin having the alkyleneoxyalkylene group (a2-1) or the straight-chain alkylene group (a3-1) having 2 to 15 carbon atoms is referred to as a "flexible difunctional epoxy resin (A)").

According to the present invention, it is possible to produce a cured epoxy resin article having high flexibility, which has never been achieved by the prior art, by applying the alkyleneoxyalkylene group (a2-1) or the straight-chain alkylene group (a3-1) having 2 to 15 carbon atoms. For example, the above-mentioned epoxy resin having increased molecular weight, which is obtained by reacting a liquid bisphenol A type epoxy resin using an aliphatic dicarboxylic acid such as dimer acid or sebacic acid as a molecular chain extender, yields a cured epoxy resin article having a flexible structure, but its effect is insufficient because of cohesion of ester groups.

In contrast, in the present invention, the alkyleneoxyalkylene group (a2-1) or the straight-chain alkylene group (a3-1) having 2 to 15 carbon atoms serves as a so-called soft segment which imparts flexibility to the difunctional epoxy resin (A), and a cured article obtained by curing the difunctional epoxy resin (A) becomes very flexible. In this case, since the aromatic hydrocarbon group (a1) serves as a so-called hard segment which imparts stiffness to the flexible difunctional epoxy resin (A), the flexible difunctional epoxy resin (A) can yield a cured epoxy resin article having both flexibility and toughness.

The alkyleneoxyalkylene group (a2-1) may include ethyleneoxyethyl group and poly(ethyleneoxy)ethyl group formed by the polyaddition reaction of ethylene oxide, propyleneoxypropyl group and poly(propyleneoxy)propyl group formed by the polyaddition reaction of propylene oxide, and a combination of ethyleneoxy group and propyleneoxy group obtained by the polyaddition reaction of ethylene oxide and propylene oxide.

The greater the number of alkylene units of the alkyleneoxyalkylene group (a2-1), the more the flexibility of the epoxy resin is improved. However, the toughness tends to be deteriorated because the crosslink density is lowered. Therefore, the number of alkylene groups in the alkyleneoxyalkylene group (a2) is from 2 to 4 in view of balance between performances.

The straight-chain alkylene group (a3-1) having 2 to 15 carbon atoms is substantially composed of a straight-chain carbon atom chain. Although the group may have a partially branched structure which does not adversely affect the flexibility, a straight-chain alkylene group having no branching is preferable in view of the flexibility.

Among the poly(alkyleneoxy)alkyl group and straight-chain alkylene group having 2 to 15 carbon atoms, the former is preferable because the flexibility is improved and also adhesion and bondability to a base material of the cured epoxy resin article are improved.

To produce a cured article which has excellent dielectric propertiesdielectric properties suited for applications such as semiconductor encapsulantsemiconductor encapsulantsemiconductor encapsulant and printed circuit boards, low dielectric constant and low dielectric dissipation factor, an aliphatic cyclic hydrocarbon group (a3-2) is preferably selected as the other hydrocarbon group (a3) (hereinafter a difunctional epoxy resin having the aliphatic cyclic hydrocarbon group (a3-2) is referred to as a "low dielectric difunctional epoxy resin (A)").

Specific examples of the aliphatic cyclic hydrocarbon group (a3-2) include those having the following structures:

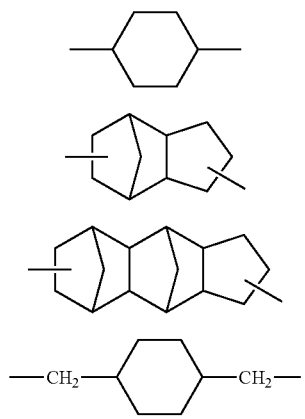

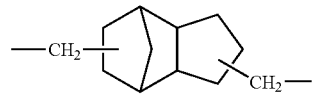

(Here, Bond-positions in the structure a3-2-2, a3-2-3, and a3-2-5 are located independently on secondary carbon atoms which belong to ethylene or propylene consisting the aliphatic rings in the structures.)

Among these groups, those having the structure a3-2-2, a3-2-3, or a3-2-5 are preferable in view of the fact that the stiffness of the epoxy resin itself is enhanced and a difunctional epoxy resin (A) having excellent dielectric properties-dielectric properties is obtained, and on the other hand, those having the structure a3-2-1 or a3-2-4 are preferable in view of excellent balance between dielectric propertiesdielectric properties, heat resistance, moisture resistance and fluidity.

In the present invention, when using, as the other hydrocarbon group (a3), not only those having the above structures, but also aromatic hydrocarbon groups having the following structures:

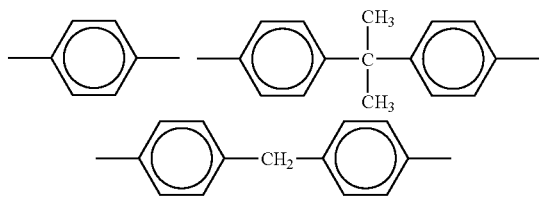

a polyarylene type difunctional epoxy resin (A) can be produced.

An acetal bond (a4), which is capable of bonding the aromatic hydrocarbon group (a1) having a bonding site with the other group in an aromatic nucleus to the hydrocarbon group (a2) having an ether bond or the other hydrocarbon group (a3), is represented by the following general formula 7:

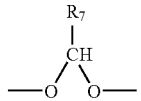

General Formula 7

In the general formula, $R_7$ is selected from hydrogen atom, methyl group, ethyl group, propyl group, and t-butyl group. Among these, a bond wherein $R_7$ is a methyl group, that is, a methylacetal bond is most preferable because it is easy to produce the difunctional epoxy resin itself and the flexibility of the cured epoxy resin article is remarkably improved.

The difunctional epoxy resin (A) can remarkably improve moisture resistance and water resistance of the cured epoxy resin article by using, as a basic skeleton, a molecular structure wherein the aromatic hydrocarbon group (a1) having a bonding site in an aromatic nucleus and the hydrocarbon group (a2) having an ether bond or the other hydrocarbon group (a3) are bonded via the bond (a3).

Particularly in the case of the flexible difunctional epoxy resin (A), when the aromatic hydrocarbon group (a1) serving as the hard segment and alkyleneoxyalkylene group (a2-1) or straight-chain alkylene group (a3-1) having 2 to 15 carbon atoms, which serves as the soft segment, are bonded via an acetal bond (a4), it becomes possible to impart flexibility to an epoxy resin structure and exhibit excellent water resistance. In the present invention, the toughness of the cured epoxy resin article is remarkably improved by directly bonding a glycidyloxy group to the aromatic nucleus. In a general-purpose epoxy resin having a structure wherein a diol compound obtained by modifying a low-molecular weight liquid bisphenol A type epoxy resin with ethylene oxide or propylene oxide is subjected to glycidyl etherification, the epoxy resin skeleton itself becomes flexible, but is inferior in activity of an epoxy group itself and crosslinking sufficient to exhibit the toughness during curing cannot be obtained. While in the flexible difunctional epoxy resin (A), since the activity of the epoxy group is enhanced by directly bonding a glycidyloxy group to the aromatic nucleus, proper crosslinking is formed during the curing reaction to exhibit excellent toughness regardless of flexible resin. Furthermore, the hard segment adjacent to the epoxy group serving as a crosslink point increases a physical strength at the crosslink point increases and improves the toughness.

Specific chemical structure of the flexible difunctional epoxy resin (A) include chemical structure having any combination of the aromatic hydrocarbon group (a1) having a bonding site with the other group in an aromatic nucleus, the alkyleneoxyalkylene group (a2-1) or the alkylene group having 2 to 15 carbon atoms (a3-1), and an acetal bond (a4). Examples thereof include those having the following structural formulas.

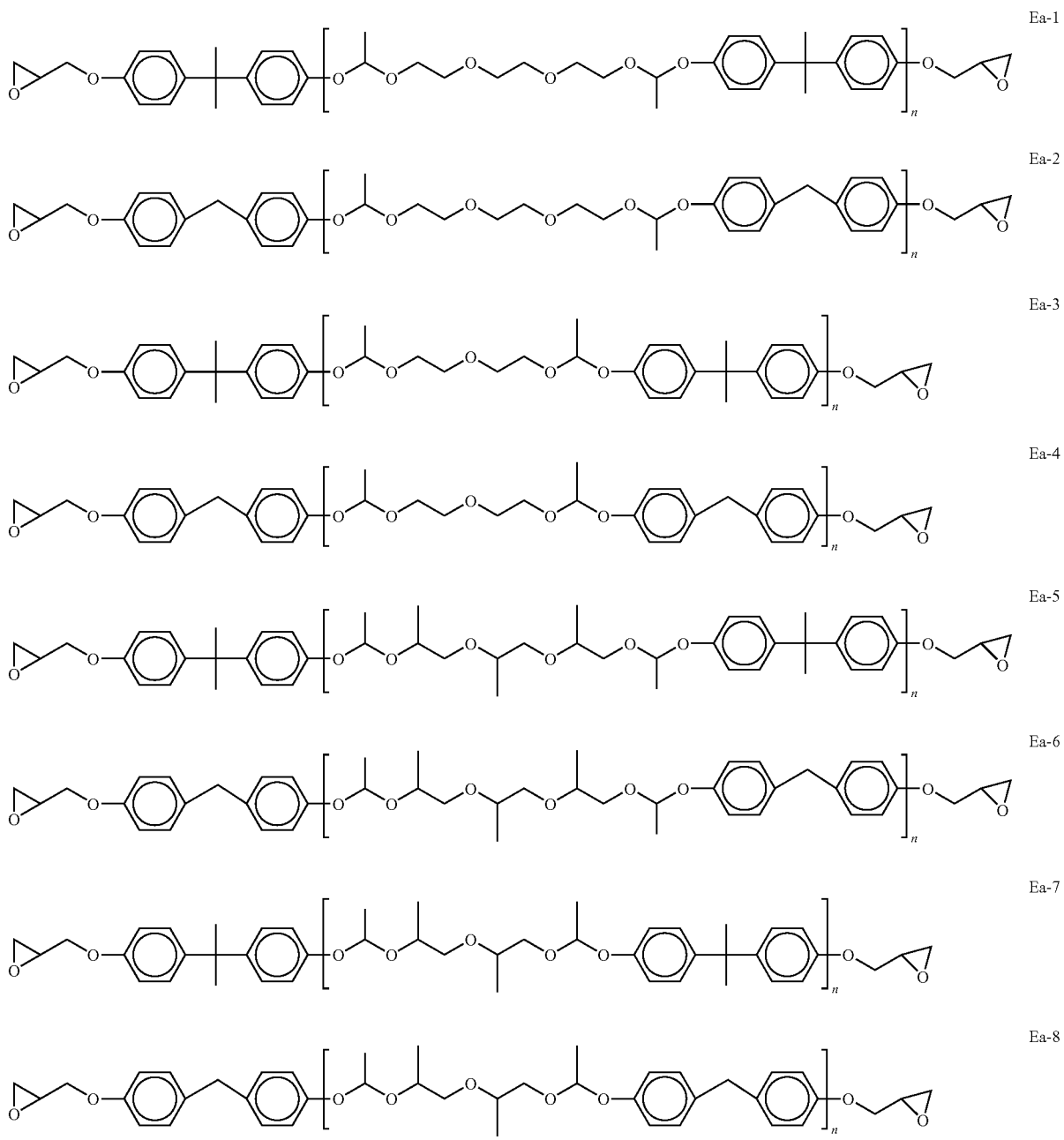

-continued
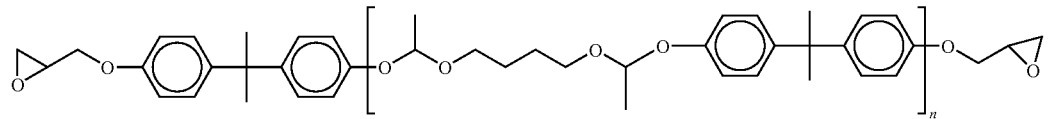
Ea-9
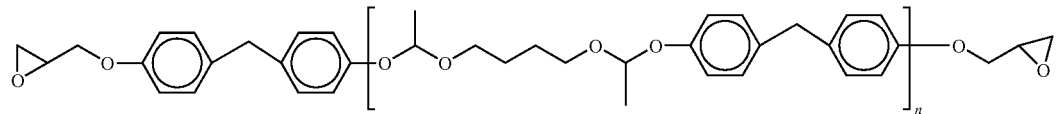
Ea-10
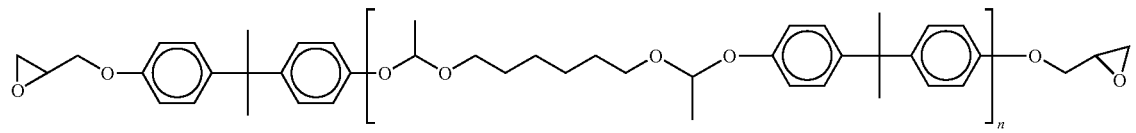
Ea-11
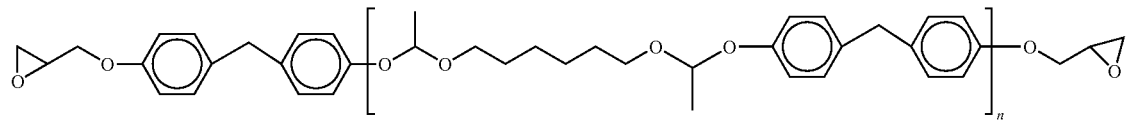
Ea-12
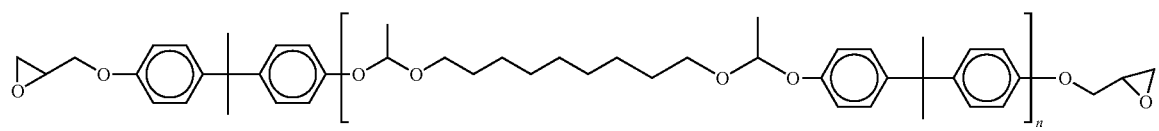
Ea-13
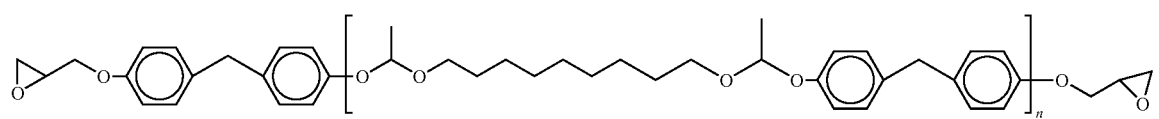
Ea-14
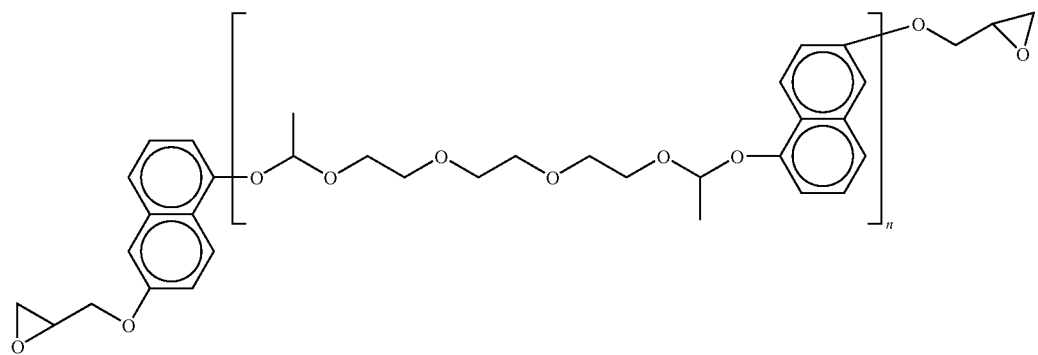
Ea-15

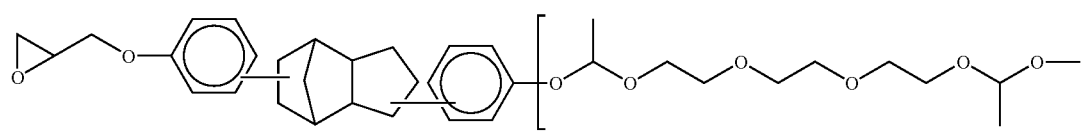
Ea-16

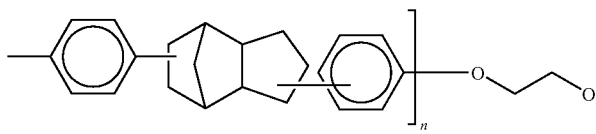
Ea-17

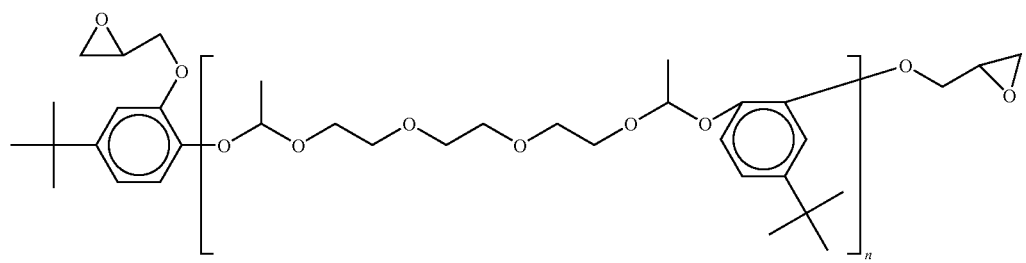

In the respective structures described above, n is a natural number, and the average thereof is from 1.2 to 5. Bond-positions in the structure Ea-16, are located independently on secondary carbon atoms which belong to ethylene or propylene consisting the aliphatic rings in the structure. Examples of the compound represented by the respective structural formulas include resin having a substituent such as methyl group or halogen atom in an aromatic nucleus.

Among these flexible difunctional epoxy resins (A), a novel epoxy resin represented by the following general formula 1:

Specific examples of the novel epoxy resin include the aforementioned epoxy resins of Ea-1 to Ea-14.

The low dielectric difunctional epoxy resin (A) has, as a basic skeleton, a molecular structure wherein the aromatic hydrocarbon group (a1) having a bonding site in an aromatic nucleus and the aliphatic cyclic hydrocarbon group (a3-2) are bonded via the acetal bond (a4). With such a structure, excellent dielectric propertiesdielectric properties are achieved in the cured epoxy resin article because of such features that (1) the distance between crosslinking points increases and the density of crosslinks decreases when the resin is cured and (2) no hydroxyl group exists in the bonding portion of the aro- General Formula 1

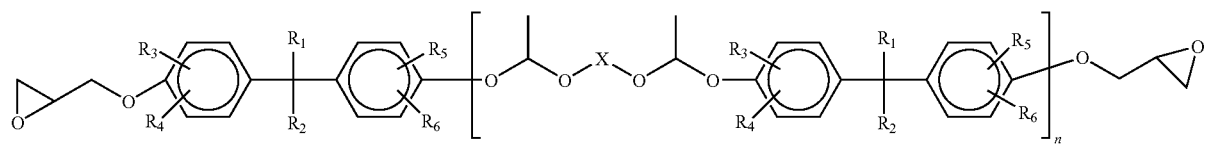

wherein $R_1$ and $R_2$ each represents a hydrogen atom or a methyl group, $R_3$ to $R_6$ each represents a hydrogen atom, a methyl group, a chlorine atom, or a bromine atom, X represents an ethyleneoxyethyl group, a di(ethyleneoxy)ethyl group, a tri(ethyleneoxy)ethyl group, propyleneoxypropyl group, a di(propyleneoxy)propyl group, a tri(propyleneoxy) propyl group, or an alkylene group having 2 to 15 carbon atoms, n is a natural number, and the average thereof is from 1.5 to 5, of the present invention is particularly preferable because of the resulting cured epoxy resin article is excellent in balance between flexibility and toughness and is also excellent in water resistance.

matic hydrocarbon group (a1) and the aliphatic cyclic hydrocarbon group (a2). Furthermore, there is achieved a feature such that (3) even if the distance between crosslinking points increases during curing, the stiffness of the epoxy resin itself is maintained and the cured article is excellent in rigidity and strength of the cured article.

Specific chemical structure of the flexible difunctional epoxy resin (A) include chemical structure having any combination of the aromatic hydrocarbon group (a1) having a bonding site with the other group in an aromatic nucleus, an aliphatic cyclic hydrocarbon group (a3-2) and an acetal bond (a3). Examples thereof include those having the following structural formulas.

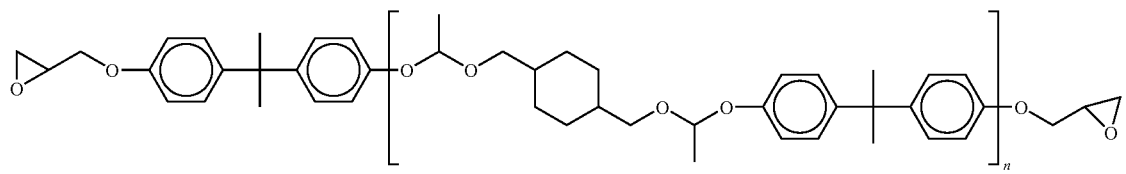
Eb-1
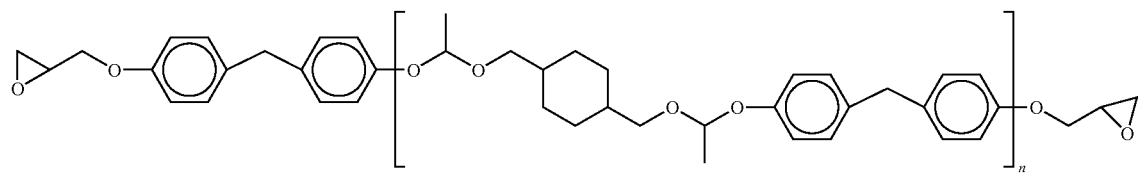
Eb-2
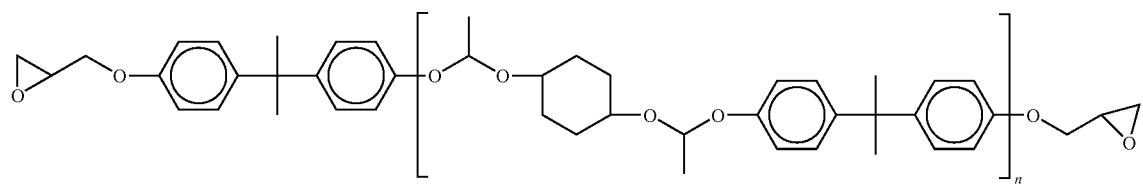
Eb-3
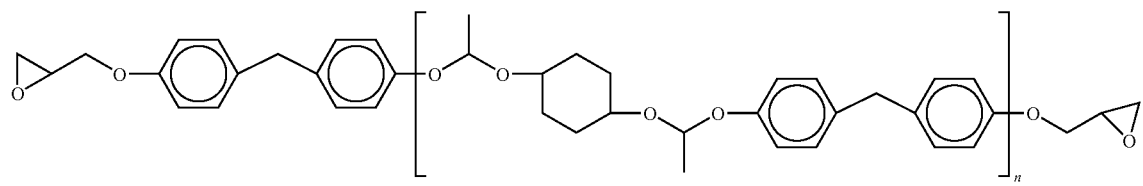
Eb-4
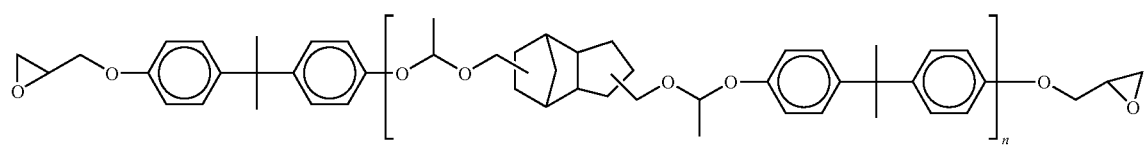
Eb-5
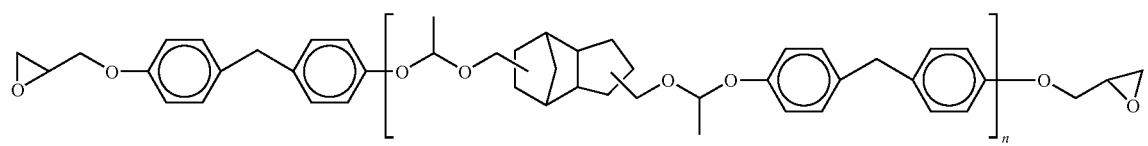
Eb-6
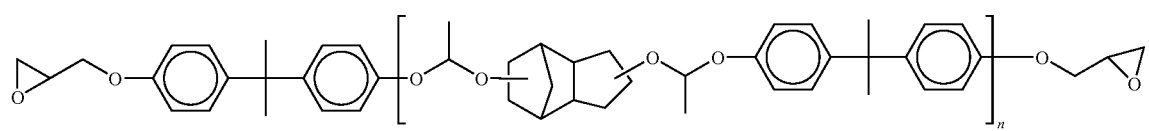
Eb-7

-continued
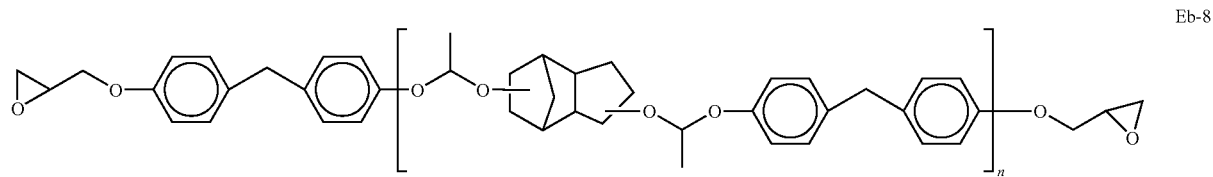
Eb-8
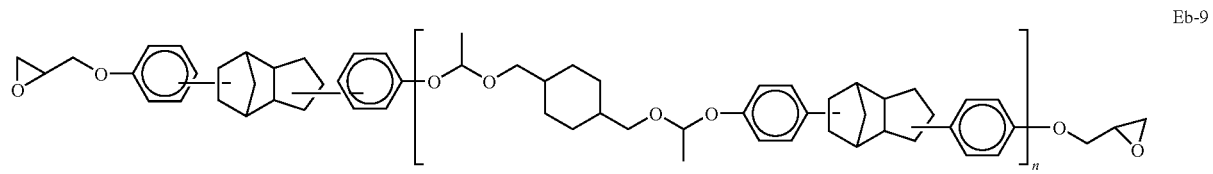
Eb-9
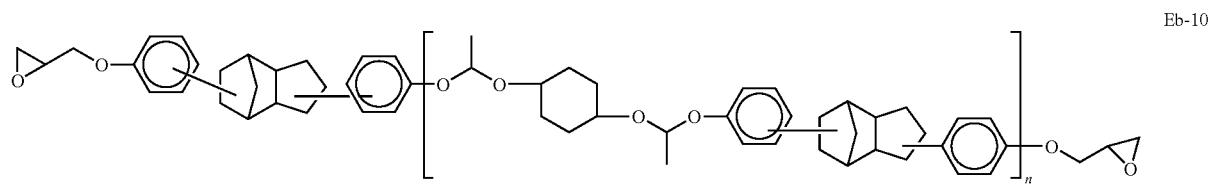
Eb-10
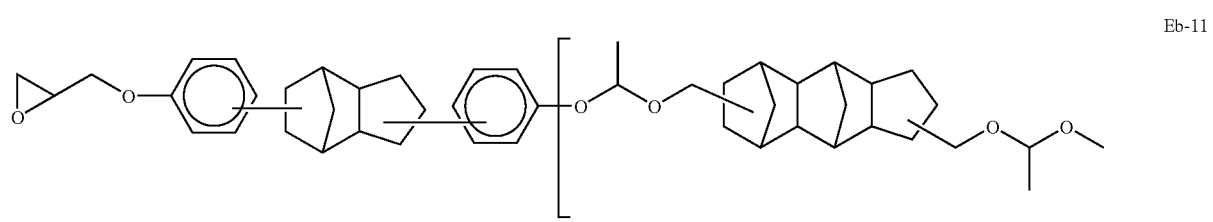
Eb-11
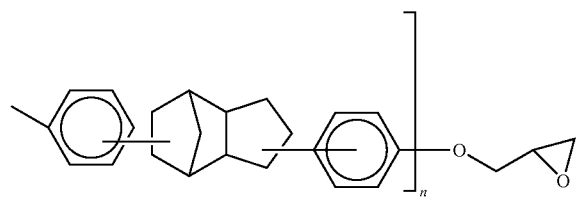
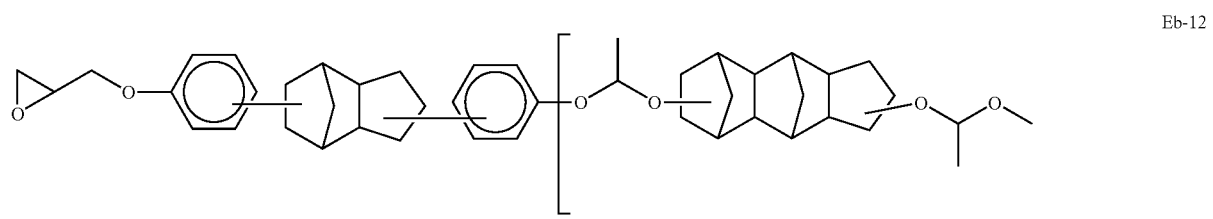
Eb-12
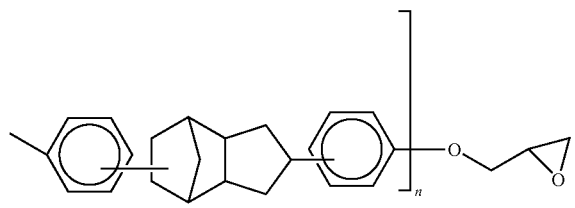

-continued

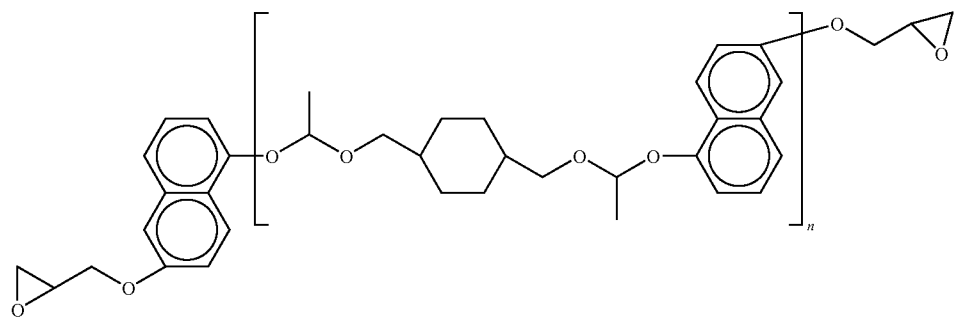
Eb-13

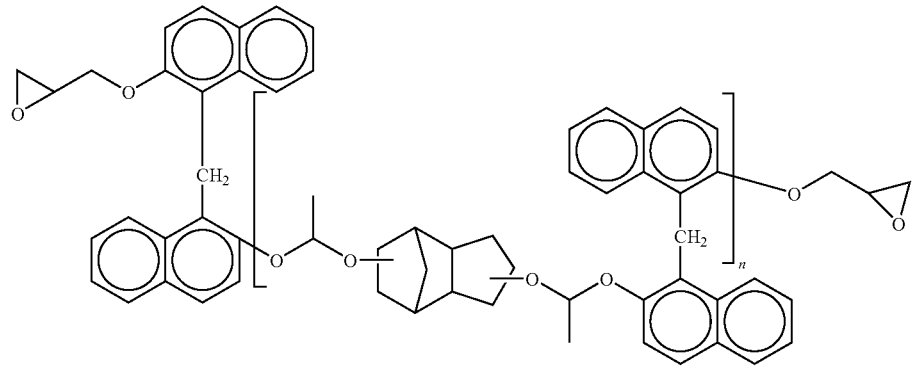
Eb-14

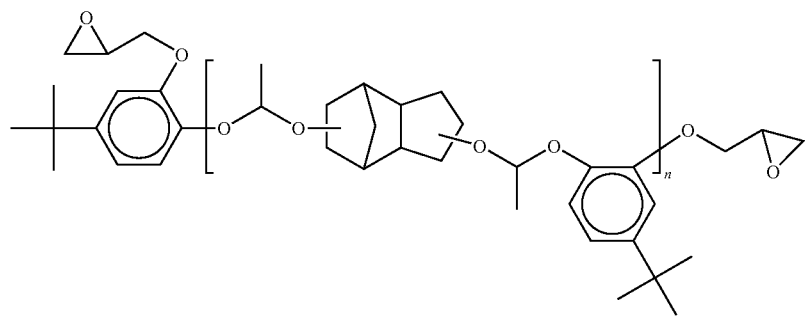
Eb-15

In the respective structures described above, n is a natural number, and the average thereof is from 1.2 to 5. Bond-positions in the structure Ea-5 to 12, Ea-14 and Ea-15, are located independently on secondary carbon atoms which belong to ethylene or propylene consisting the aliphatic rings in the structures. Examples of the compound represented by the respective structural formulas include resin having a substituent such as methyl group or halogen atom in an aromatic nucleus.

Among these flexible difunctional epoxy resins (A), a novel epoxy resin represented by the following general formula 2:

wherein $R_1$ and $R_2$ each represents a hydrogen atom or a methyl group, $R_3$ to $R_6$ each represents a hydrogen atom, a methyl group, a chlorine atom, or a bromine atom, X represents a $C_{6-17}$ aliphatic hydrocarbon group having a cycloalkane skeleton, n is a natural number, and the average thereof is from 1.2 to 5, of the present invention is particularly preferable because proper flexibility is imparted to the cured epoxy resin article while maintaining excellent dielectric propertiesdielectric properties and the resulting cured epoxy resin article is excellent in toughness.

Specific examples of the novel epoxy resin include the aforementioned epoxy resins of Eb-1 to Eb-8.

General Formula 2

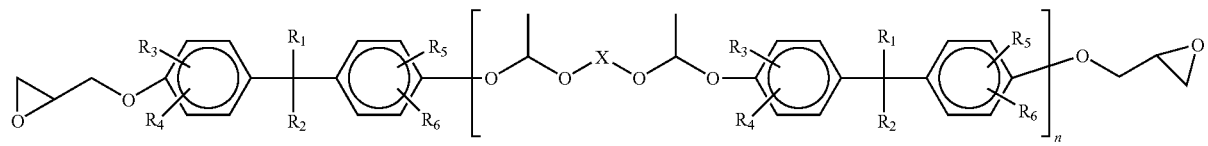

Because of excellent dielectric propertiesdielectric properties, excellent heat resistance and water resistance as well as improved fluidity, a novel epoxy resin represented by the following general formula 3:

General Formula 3

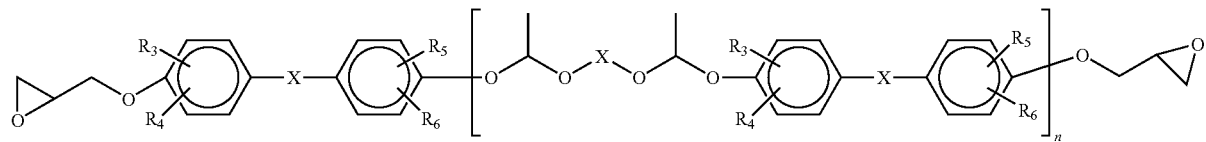

wherein $R_3$ to $R_6$ each represents a hydrogen atom, a methyl group, a chlorine atom, or a halogen atom, X each independently represents an aliphatic cyclic hydrocarbon group having 6 to 15 carbon atoms, n is a natural number, and the average thereof is from 1.2 to 5, of the present invention is particularly preferable.

Specific examples of the novel epoxy resin include the aforementioned epoxy resins of Eb-9 to Eb-12.

The epoxy resin composition of the present invention contains the difunctional epoxy resin (A) as an essential epoxy resin component. However, the difunctional epoxy resin (A) can be used in combination with a component not having increased molecular weight, that is, a difunctional epoxy resin (A') having a structure wherein a glycidyloxy group is bonded to an aromatic nucleus of the aromatic hydrocarbon group (a1) having a bonding site in the aromatic nucleus.

When using the flexible difunctional epoxy resin (A) in combination with the difunctional epoxy resin (A'), the viscosity of the epoxy resin composition decreases and the operability in the case of application is improved and the cured article is excellent in toughness.

Specific examples of the difunctional epoxy resin (A') include those of the aforementioned structural formulas of Ea-1 to Ea-17 wherein n=0. Therefore, in the case of a mixture of the epoxy resins of the structural formulas Ea-1 to Ea-17, the average of n is preferably within a range from 1 to 3.

An existing ratio of the flexible difunctional epoxy resin (A) to the difunctional epoxy resin (A'), (A)/(A'), is preferably from 90/10 to 60/40 by weight because the cured article is excellent in balance between toughness and flexibility. The mixture of the difunctional epoxy resin (A) and the difunctional epoxy resin (A') preferably has an epoxy equivalent of 250 to 1000 g/eq and a viscosity at 25° C. of 2000 to 150000 mPa·s. The mixture has a feature such that it has low melt viscosity and is not solidified regardless of comparatively high epoxy equivalent, and an epoxy resin mixture having flexibility, good adhesion and excellent operability can be obtained.

When using a low dielectric difunctional epoxy resin (A), it is to achieve good balance between melt viscosity of the epoxy resin composition and performances of the cured article by using it in a mixture with the difunctional epoxy resin (A') having a structure wherein a glycidyloxy group is bonded to the aromatic nucleus of the aromatic hydrocarbon group (a1). For example, in the case in which the difunctional epoxy resin (A') has a structure represented by the following general formula 8:

General Formula 8

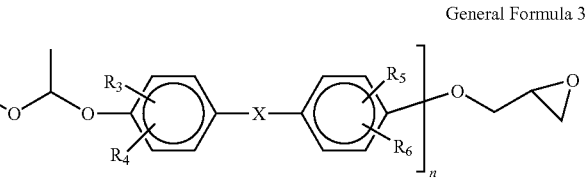

wherein $R_1$ and $R_2$ each represents a hydrogen atom or a methyl group, $R_3$ to $R_6$ each represents a hydrogen atom, a methyl group, a chlorine atom, or a halogen atom, X each independently represents an aliphatic cyclic hydrocarbon group having 6 to 15 carbon atoms, the toughness of the cured article is improved.

In the case in which the difunctional epoxy resin (A') has a structure represented by the following general formula 9:

General Formula 9

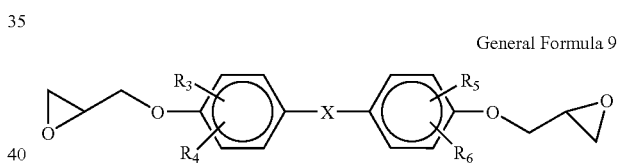

wherein $R_1$ and $R_2$ each represents a hydrogen atom or a methyl group, $R_3$ to $R_6$ each represents a hydrogen atom, a methyl group, a chlorine atom, or bromine atom, and X represents a $C_{6-17}$ aliphatic hydrocarbon group having a cycloalkane skeleton, it is possible to achieve good balance between heat resistance, water resistance and dielectric propertiesdielectric properties.

Specific examples of the difunctional epoxy resin (A') corresponding to the general formula 8 include those of the aforementioned structural formulas of Eb-1 to Eb-8 wherein n=0. Specific examples of the difunctional epoxy resin corresponding to the general formula 9 include those of the aforementioned structural formulas of Eb-9 to Eb-12 wherein n=0. Similarly, those of the aforementioned structural formulas of E-13 to E-15 wherein n=0 are also included in the difunctional epoxy resin (A'). In the case of a mixture of epoxy resins of the structural formulas Eb-1 to Eb-15, the average of n is preferably within a range from 0.5 to 4.5.

An existing ratio of the flexible difunctional epoxy resin (A) to the difunctional epoxy resin (A'), (A)/(A'), is preferably from 90/10 to 60/40 by weight in view of balance between performances of the cured article. The mixture of the difunctional epoxy resin (A) and the difunctional epoxy resin (A') preferably has an epoxy equivalent of 300 to 1000 g/eq and a viscosity at 25° C. of 20 to 500 mPa·s. The mixture preferably has a viscosity at 150° C. of 0.1 to 1.0 Pa·s. The difunctional epoxy resin (A) has a feature such that it has high molecular weight and is excellent in dielectric properties because the distance between crosslinking points increases during curing, and it is also excellent in fluidity. Therefore, by controlling to the above mixing ratio, the fluidity of the epoxy resin composition can be enhanced while maintaining excellent dielectric properties and a filling factor of the inorganic filler can be enhanced in applications such as semiconductor encapsulant.

In the production of the epoxy resin composition, the difunctional epoxy resin (A) and the difunctional epoxy resin (A') can be used as a mixture thereof.

The difunctional epoxy resin (A) described above in detail can be produced by acetalization of a difunctional phenol compound (a1'), a dialcohol of a hydrocarbon compound having an ether bond or a dialcohol of the other hydrocarbon compound, and a carbonyl compound, and glycidyl etherification of the resulting difunctional phenol.

However, it is preferably produced by the process of the present invention in view of good industrial productivity.

Therefore, the difunctional epoxy resin (A) is preferably produced by reacting a difunctional phenol compound (a1') with a divinyl ether (a2') of a hydrocarbon compound having an ether bond or a divinyl ether (a3') of the other hydrocarbon compound (hereinafter this step is referred to as a "step 1"), and reacting the resulting difunctional phenol resin with epihalohydrin (hereinafter this step is referred to as a "step 2"). Since the reaction product produced by this process is commonly obtained as a mixture of a difunctional epoxy resin (A) and a difunctional epoxy resin (A'), the mixture can be used as it is as an epoxy resin component in the present invention.

In the above process, an acetal bond is formed by the reaction between a phenolic hydroxyl group in the phenol compound (a1') and a vinyl ether group in the above (a2') or (a3'), as shown in the following reaction scheme.

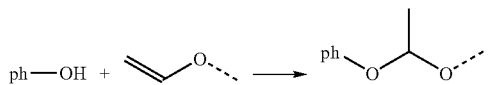

Specific examples of the difunctional phenol compound (a1') include dihydroxybenzenes such as hydroquinone, resorcin, and catechol; dihydroxynaphthalenes such as 1,6-dihydroxynaphthalene, 2,7-dihydroxynaphthalene, 1,4-dihydroxynaphthalene, 1,5-dihydroxynaphthalene, 2,3-dihydroxynaphthalene, and 2,6-dihydroxynaphthalene; bisphenols such as bis(4-hydroxyphenyl)methane, 2,2-bis(4-hydroxyphenyl)propane, 2,2-bis(3-methyl-4-hydroxyphenyl)propane, 1,1-bis(4-hydroxyphenyl)cyclohexane, 1,1-bis(4-hydroxyphenyl)-1-phenylethane, and bis(4-hydroxyphenyl)sulfone; alicyclic structure-containing phenols such as polyadduct of phenol and dicyclopentadiene, and polyadduct of phenol and terpene compound; bisnaphthols such as bis(2-hydroxy-1-naphthyl)methane and bis(2-hydroxy-1-naphthyl)propane; and so-called xylok-type phenol resin, which is a condensation reaction product of phenol and phenylene dimethyl chloride or biphenylene dimethyl chloride. The difunctional phenol compound further includes difunctional phenol compounds having a structure wherein a substituent such as methyl group, t-butyl group or halogen atom is substituted on the aromatic nucleus of the above respective compounds. It should be noted that although the above alicyclic structure-containing phenols or xylok-type phenol resins may include not only difunctional components but also trifunctional components at the same time, they can be used in step 1 as they are according to the present invention.

Among these, bisphenols are preferable because the resulting cured epoxy resin article is excellent in balance between flexibility and toughness, and bis(4-hydroxyphenyl)methane and 2,2-bis(4-hydroxyphenyl)propane are particularly preferable because of their remarkable capability of imparting toughness. Furthermore, in the case of focusing on the moisture resistance of the cured epoxy resin article, alicyclic structure-containing phenols are preferable.

The divinyl ether (a2') of the hydrocarbon compound having an ether bond is used to produce a flexible difunctional epoxy resin and is represented, for example, by the following general formula.

General Formula 10

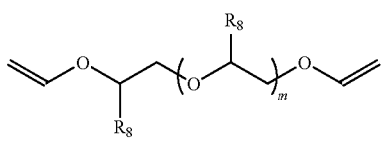

In the general formula 10, $R_8$ is a hydrogen atom or a methyl group, and m is 0 or a natural number of 1 to 4. When $R_8$ is a hydrogen atom, it has a polyethylene glycol skeleton. When it is a methyl group, it has a polypropylene glycol skeleton.

In the present invention, $R^8$ in the general formula 10 may have a structure wherein a hydrogen atom and a methyl group exist at random, that is, a structure of being copolycondensed with ethylene oxide or propylene oxide.

In the case of producing a flexible difunctional epoxy resin, the divinyl ether (a3') of the other hydrocarbon compound is preferably a divinyl ether of an alkylene having 2 to 15 carbon atoms and examples thereof include divinyl ethers of straight-chain alkylene groups, such as polytetramethylene glycol divinyl ether, 1,3-butylene glycol divinyl ether, 1,4-butanediol divinyl ether, 1,6-hexanediol divinyl ether, 1,9-nonanediol divinyl ether, and 1,10-decanediol divinyl ether; and divinyl ethers of branched alkylene groups, such as neopentyl glycol divinyl ether. Among these, divinyl ethers of straight-chain alkylene groups are particularly preferable in view of the flexibility of the cured epoxy resin article.

Among these, a divinyl ether represented by the general formula 10 is particularly preferable because the melt viscosity of the flexible difunctional epoxy resin (A) decreases and the resulting cured epoxy resin article is excellent in toughness and flexibility, and thus bending properties, adhesion and bondability are improved. When using the divinyl ether, since an epoxy resin having high hydrophilicity is obtained because of its polyether structure, an aqueous or emulsion type epoxy resin composition can be easily prepared.

In the case of producing the low dielectric difunctional epoxy resin (A), examples of the divinyl ether (a3') of the other hydrocarbon compound include divinyl ethers having a cycloalkane structure, such as 1,4-cyclohexane diol divinyl ether, 1,4-cyclohexane dimethanol divinyl ether, tricyclodecane diol divinyl ether, tricyclodecane dimethanol divinyl ether, pentacyclopentadecane dimethanol divinyl ether, and pentacyclopentadecane diol divinyl ether.

In the case of producing a polyarylene type difunctional epoxy resin (A), examples of the divinyl ether (a3') of the other hydrocarbon compound include bisphenol A divinyl ether, bisphenolF divinyl ether, and hydroquinone divinyl ether.

The above step 1 is a step of reacting the difunctional phenol compound (a1') with the divinyl ether (a2') of the hydrocarbon compound having an ether bond or the divinyl ether (a3') of the other hydrocarbon compound to produce a difunctional phenol resin as a raw material for epoxy resin.

Specifically, the desired difunctional phenol resin can be obtained by charging the difunctional phenol compound (a1') and the divinyl ether (a2') of the hydrocarbon compound having an ether bond or the divinyl ether (a3') of the other hydrocarbon compound in a reaction vessel and heating while mixing them with stirring.

In this case, an organic solvent can be optionally used. Examples of the organic solvent include aromatic organic solvents such as benzene, toluene, and xylene; ketone organic solvents such as acetone, methylethyl ketone, methylisobutyl ketone, and cyclohexanone; and alcohol organic solvents such as methanol, ethanol, isopropyl alcohol, and normal butanol.

Although the reaction sufficiently proceeds without using a catalyst, the catalyst can be appropriately used in view of selection of raw materials and an increase in reaction rate. Examples of usable catalysts include inorganic acids such as sulfuric acid, hydrochloric acid, nitric acid, and phosphoric acid; organic acids such as toluenesulfonic acid, methanesulfonic acid, xylenesulfonic acid, trifluoromethanesulfonic acid, oxalic acid, formic acid, trichloroacetic acid, and trifluoroacetic acid; and Lewis acids such as aluminum chloride, iron chloride, tin chloride, gallium chloride, titanium chloride, aluminum bromide, gallium bromide, boron trifluoride-ether complex, and boron trifluoride-phenol complex. The amount of the catalyst is usually within a range from 10 ppm to 1% by weight based on the total weight of the divinyl ether (a2') of the hydrocarbon compound having an ether bond and the divinyl ether (a3') of the other hydrocarbon compound. In this case, the kind and the amount of the catalyst are preferably selected so as not to cause the nucleus addition reaction of a vinyl group to the aromatic ring.

The reaction conditions in step 1 can be selected from a range from 25° C. to 200° C., and a temperature ranging from 50° C. to 150° C. is preferable because proper reaction rate can be achieved. The reaction time varies depending on the scale, but is preferably within a range from 0.5 to 30 hours. In this case, the reaction is preferably carried out in an oxygen atmosphere so as to prevent self-polymerization of a vinyl ether group. The degree to which the reaction proceeds can be monitored by measuring the residual amount of the raw material using gas chromatography or liquid chromatography. When using the organic solvent, the organic solvent is removed by distillation. When using the catalyst, the catalyst is optionally deactivated by a quencher and is removed by a washing or filtration operation. When using the organic solvent or catalyst (including deactivated catalyst residue), which does not adversely affect the epoxidation reaction in the subsequent step, the purification may be unnecessary.

A reaction ratio of the difunctional phenol compound (a1') to the divinyl ether (a2') of the hydrocarbon compound having an ether bond or the divinyl ether (a3') of the other hydrocarbon compound in the above reaction may be appropriately selected according to properties of the desired difunctional phenol resin. In the production of the flexible difunctional epoxy resin (A), the amount of the divinyl ether (a2') of the hydrocarbon compound having an ether bond or the divinyl ether (a3') of the other hydrocarbon compound may be increased in order to enhance the effect of improving flexibility, moisture resistance and dielectric properties of the cured epoxy resin article.

Specifically, a ratio of a phenolic hydroxyl group in the difunctional phenol compound (a1') to a vinyl ether group in the divinyl ether (a2') of the hydrocarbon compound having an ether bond or the divinyl ether (a3') of the other hydrocarbon compound, (phenolic hydroxyl group)/(vinyl ether group), is preferably from 80/20 to 50/50 (by molar ratio). In the case in which a conversion ratio of the divinyl ether (a2') of the hydrocarbon compound having an ether bond or the divinyl ether (a3') of the other hydrocarbon compound is low due to an influence of the side reaction, a proportion of the vinyl ether group may be increased.

In the case of focusing on the balance between physical properties such as curability and heat resistance, a ratio (phenolic hydroxyl group)/(vinyl ether group) is preferably within a range from 95/5 to 80/20 (by molar ratio).

In the production of the low dielectric difunctional epoxy resin (A), the amount of the divinyl ether compound (a3') of the other hydrocarbon compound may be increased in order to enhance the effect of improving flexibility, moisture resistance and dielectric properties of the difunctional epoxy resin finally obtained.

Specifically, a ratio of a phenolic hydroxyl group in the difunctional phenol compound (a1') to a vinyl ether group in the divinyl ether compound (a3') of the other hydrocarbon compound, (phenolic hydroxyl group)/(vinyl ether group) is preferably within a range from 80/20 to 50/50 (by molar ratio).

In the case in which a conversion ratio of a divinyl ether group in the divinyl ether compound (a3') as the hydrocarbon compound is low due to an influence of the side reaction, the proportion of the vinyl ether group may be increased. In the case of focusing on the balance between physical properties such as curability and heat resistance, the ratio (phenolic hydroxyl group)/(vinyl ether group) is preferably within a range from 95/5 to 80/20 (by molar ratio).

The structure of the difunctional phenol resin thus obtained varies depending on the combination of raw materials. For example, when using the divinyl ether of the alkylene having 2 to 15 carbon atoms or the divinyl ether represented by the general formula 10 as the raw material of the flexible difunctional epoxy resin (A), examples of the resulting difunctional phenol resin include those represented by the following structural formulas.

Pa-1

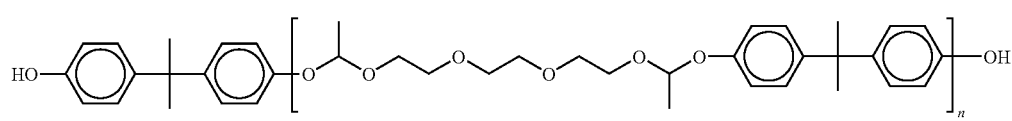

-continued
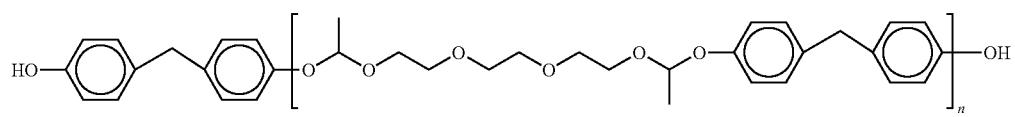
Pa-2
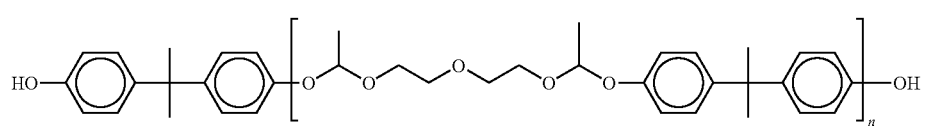
Pa-3
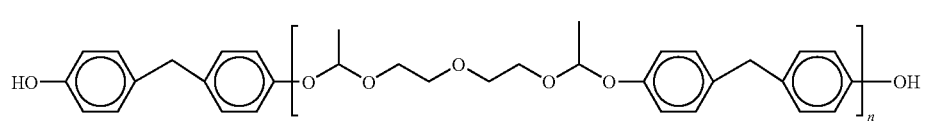
Pa-4
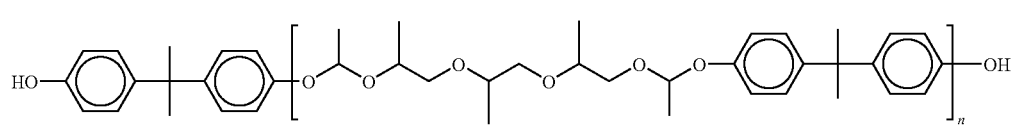
Pa-5
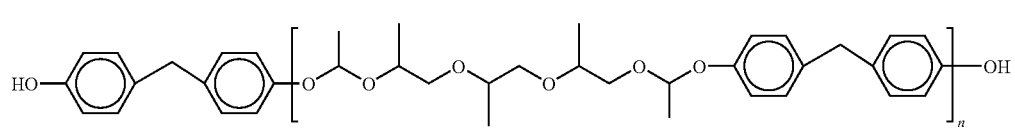
Pa-6
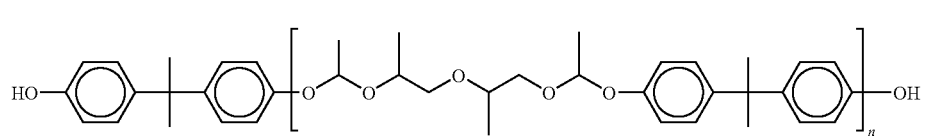
Pa-7
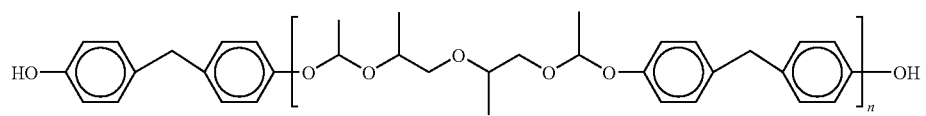
Pa-8
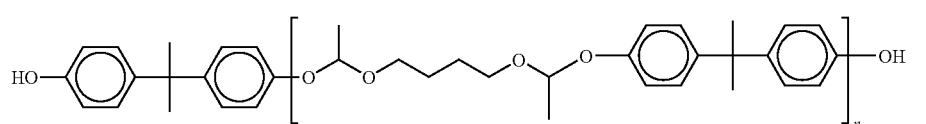
Pa-9
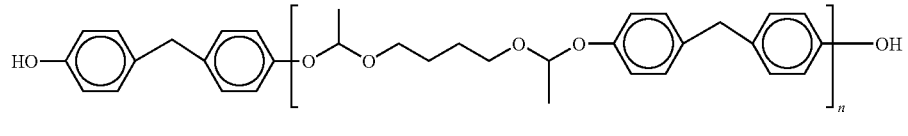
Pa-10
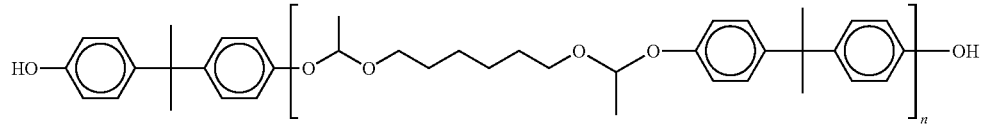
Pa-11
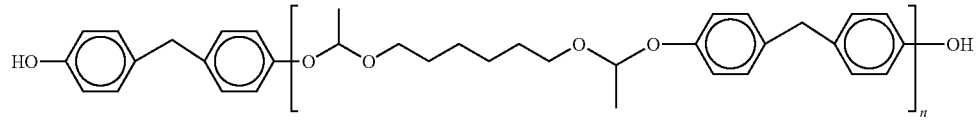
Pa-12
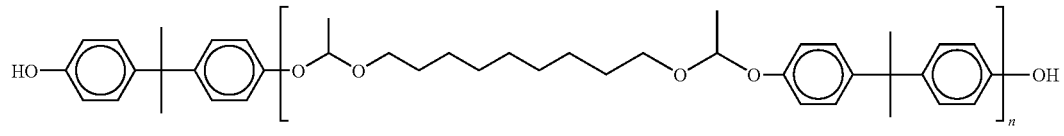
Pa-13

-continued

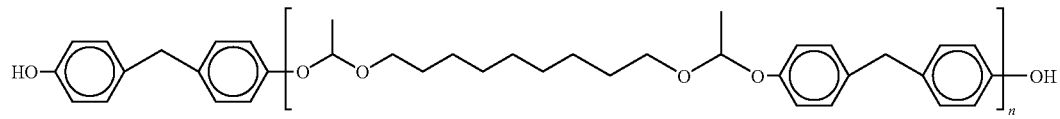
Pa-14

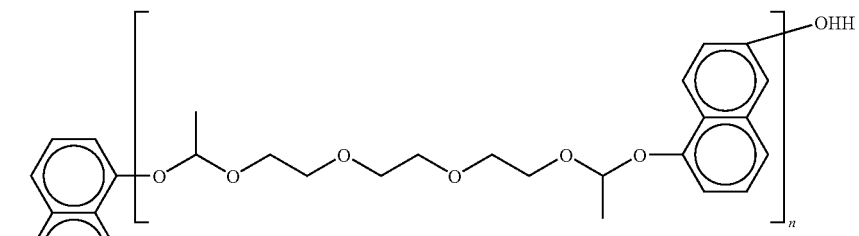
Pa-15

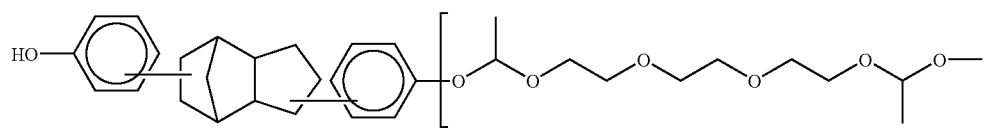
Pa-16

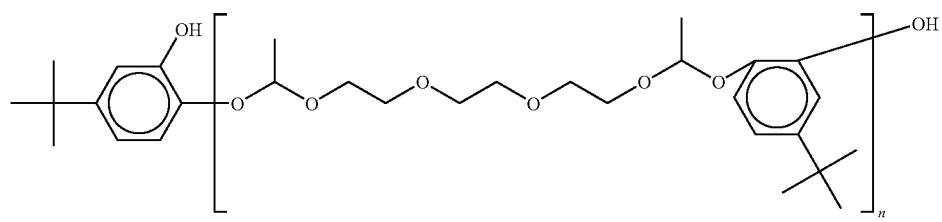
Pa-17

In the respective structures described above, n is a natural number, and the average thereof is from 1.5 to 5. Bond-positions in the structure Pa-16, are located independently on secondary carbon atoms which belong to ethylene or propylene consisting the aliphatic rings in the structure. Examples of the compounds represented by the respective structural formulas include resins having a substituent such as methyl group or halogen atom in the aromatic nucleus.

Among the difunctional phenol resins, a novel phenol resin represented by the following general formula 4:

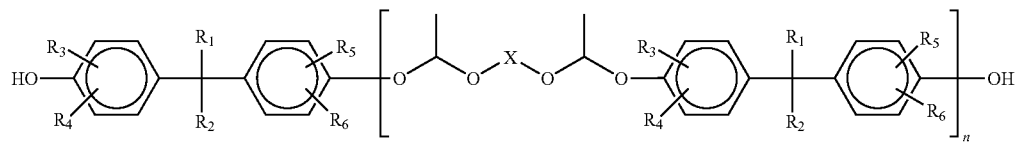
General Formula 4 wherein $R_1$ and $R_2$ each represents a hydrogen atom or a methyl group, $R_3$ to $R_6$ each represents a hydrogen atom, a methyl group, a chlorine atom, or a bromine atom, X represents an ethyleneoxyethyl group, a di(ethyleneoxy)ethyl group, a tri(ethyleneoxy)ethyl group, propyleneoxypropyl group, a di(propyleneoxy)propyl group, a tri(propyleneoxy) propyl group, or an alkylene group having 2 to 15 carbon atoms, n is an natural number, and the average thereof is from 1.5 to 5, is particularly preferable because the resulting cured epoxy resin article is excellent in balance between flexibility and toughness and is also excellent in water resistance.

Specific examples of the novel phenol resin include the aforementioned compounds of Pa-1 to Pa-14.

The difunctional phenol resin is obtained as a mixture of those having structural formulas of Pa-1 to Pa-17 wherein n=0. In the case of a mixture of those having the structural formulas of Pa-1 to Pa-17, the average of n is preferably within a range from 1 to 4.5.

When using a divinyl ether having a cycloalkane structure as the raw material of a low dielectric difunctional epoxy resin (A), typical examples thereof include those represented by the following structural formulas.
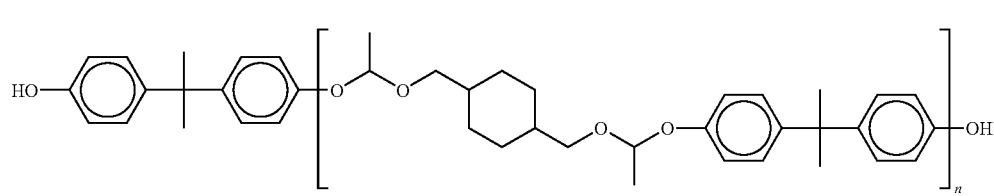
Pb-1
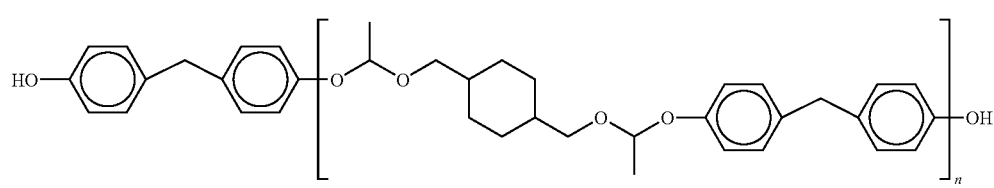
Pb-2
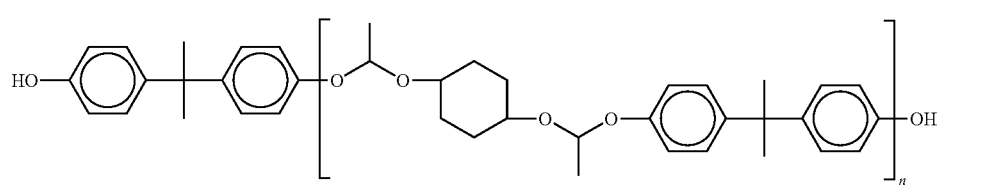
Pb-3
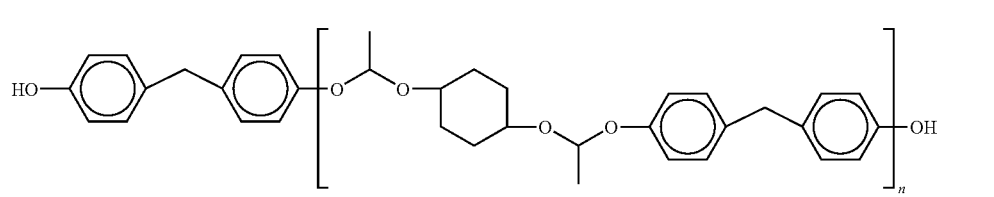
Pb-4
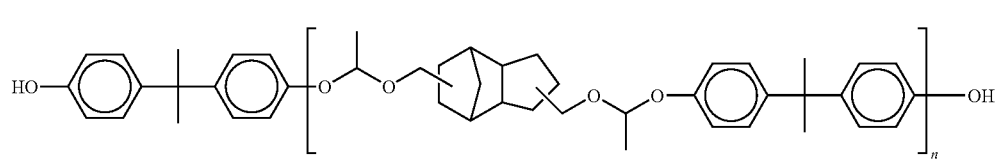
Pb-5
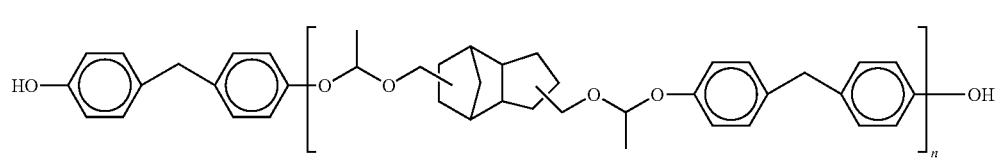
Pb-6
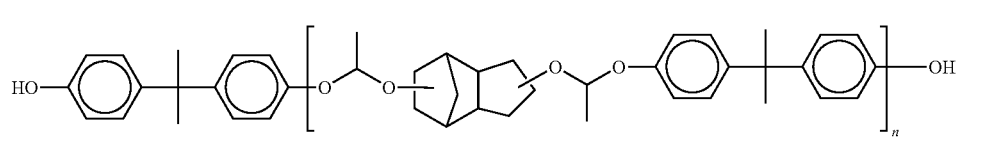
Pb-7
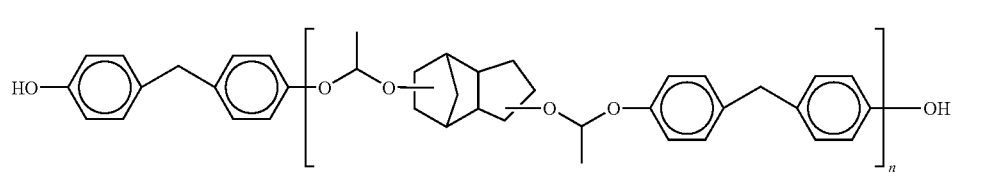
Pb-8
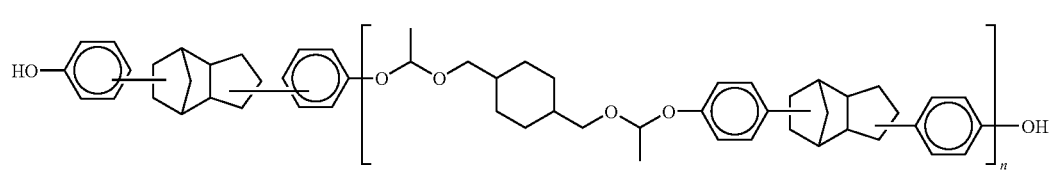
Pb-9

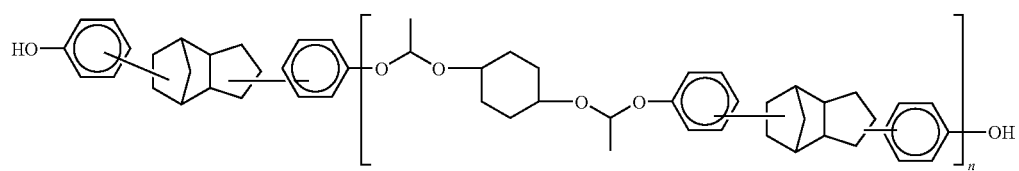
Pb-10
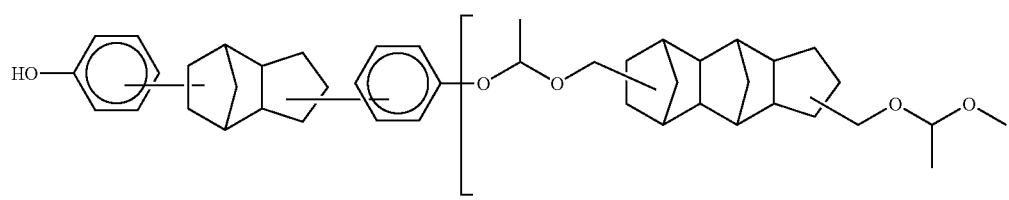
Pb-11
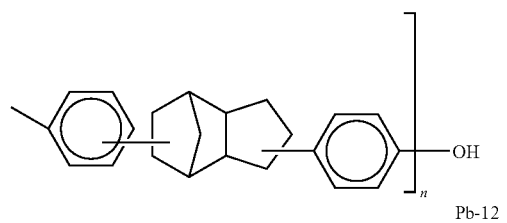
Pb-12
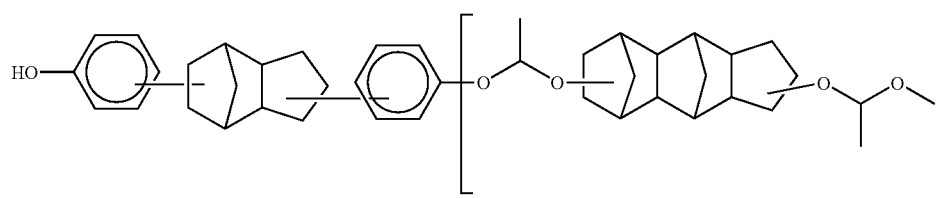
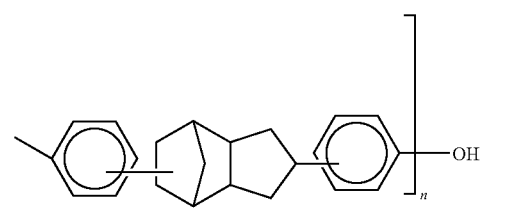
Pb-13
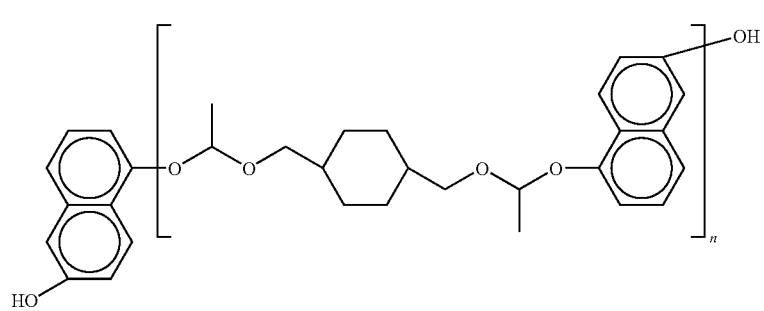
Pb-14
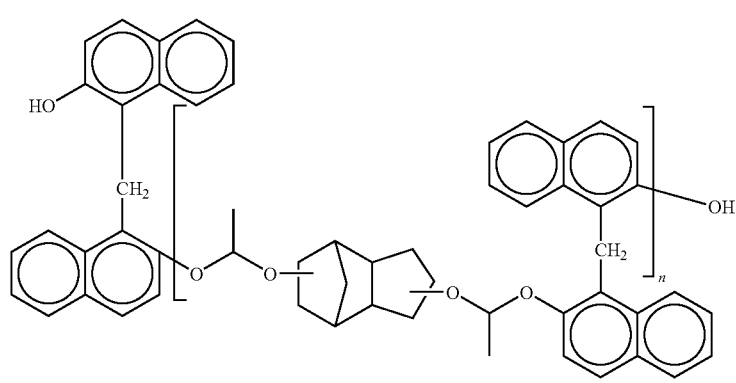

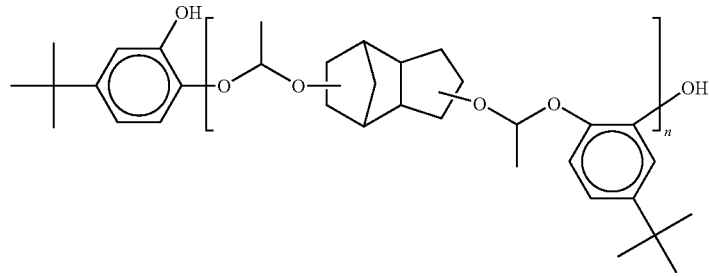
Pb-15

In the respective structures described above, n is a natural number, and the average thereof is from 1.5 to 5. Bond-positions in the structure Pa-5 to 12, Pa-14 and Pa-15, are located independently on secondary carbon atoms which belong to ethylene or propylene consisting the aliphatic rings in the structures.

The compounds represented by the respective structural formulas also include resins having a substituent such as methyl group or halogen atom in the aromatic nucleus.

Among the difunctional phenol resins, a novel phenol resin represented by the following general formula 5:

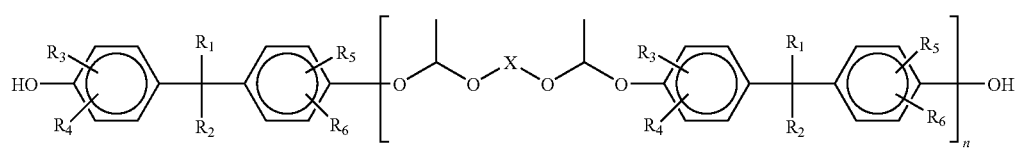
General Formula 5 wherein $R_1$ and $R_2$ each represents a hydrogen atom or a methyl group, $R_3$ to $R_6$ each represents a hydrogen atom, a methyl group, a chlorine atom, or a bromine atom, X represents a $C_{6-17}$ aliphatic hydrocarbon group having a cycloalkane skeleton, n is a natural number, and the average thereof is from 1.5 to 5, is particularly preferable because the resulting cured epoxy resin article is provided with proper flexibility while maintaining excellent dielectric propertiesdielectric properties and is also excellent in toughness. Specific examples of the novel phenol resin include the aforementioned compounds of Pb-1 to Pb-8.

Since the resulting cured epoxy resin article is excellent in dielectric propertiesdielectric properties, heat resistance, water resistance and fluidity, a novel phenol resin represented by the following general formula 6:

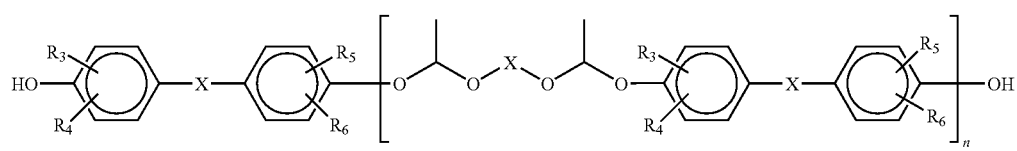
General Formula 6 wherein $R_3$ to $R_6$ each represents a hydrogen atom, a methyl group, a chlorine atom, or a halogen atom, X each independently represents an aliphatic cyclic hydrocarbon group having 6 to 15 carbon atoms, n is a natural number, and the average thereof is from 1.5 to 5, is particularly preferable. Specific examples of the novel phenol resin include the aforementioned compounds of Pb-9 to Pb-12.

The difunctional phenol resin is obtained as a mixture of those having structural formulas of Pb-1 to Pb-15 wherein n=0. In the case of a mixture of those having the structural formulas of Pb-1 to Pb-15, the average of n is preferably within a range from 1.5 to 5.

The desired difunctional epoxy resin (A) can be produced by reacting the difunctional phenol resin thus obtained with epihalohydrin in the subsequent step 2. Examples of the epihalohydrin include epichlorohydrin and epibromohydrin.

Although the reaction conditions are not specifically limited in the reaction of step 2, the reaction is preferably carried out under the conditions of a temperature of 20° C. to 120° C. by or while adding an alkali metal hydroxide such as sodium hydroxide or potassium hydroxide in a melted mixture of the difunctional phenol resin and epihalohydrin. The reaction time varies depending on the scale, but is preferably from 1 to 10 hours. The amount of epihalohydrin is usually within a range from 0.3 to 20 equivalents per equivalent of a hydroxyl group in the difunctional phenol resin as the raw material. However, the greater the amount of excess epihalohydrin, the closer to the theoretical structure the resulting difunctional epoxy resin becomes, and it becomes possible to prevent formation of a secondary hydroxyl group due to the reaction between an unreacted phenolic hydroxyl group and an epoxy group. The amount is preferably within a range from 2.5 to 20 equivalents from such a point of view.

The alkali metal hydroxide may be used in the form of an aqueous solution. In this case, the reaction can be conducted while continuously adding the aqueous solution of the alkali metal hydroxide in a reaction system and continuously distilling off water and epihalohydrin under reduced pressure or normal pressure. Furthermore, there can be applied a method of removing water and continuously returning epihalohydrin into the reaction system by partitioning the distillate.

There can also be used another method of adding a quaternary ammonium salt such as tetramethylammonium chloride, tetramethylammonium bromide or trimethylbenzylammonium chloride, as a catalyst, to a melted mixture of the difunctional phenol resin and epihalohydrin, reacting the mixture under the conditions of a temperature of 50° C. to 150° C. to form a halohydrin etherified product, adding an alkali metal hydroxide in the from of a solid or an aqueous solution, and reacting the mixture again under the conditions of a temperature of 20° C. to 120° C., thereby causing dehydrohalogenation (cyclization). The reaction time is not specifically limited, but is usually from 1 to 5 hours in the case of a production reaction of a halohydrin etherified product, and is from 1 to 10 hours in the case of the dehydrohalogenation reaction.

In step 2, the reaction is preferably conducted by adding alcohols such as methanol, ethanol, isopropyl alcohol, and butanol; ketones such as acetone and methyl ethyl ketone; ethers such as dioxane; and aprotic polar solvents such as dimethyl sulfone and dimethyl sulfoxide so that the reaction proceeds smoothly. The amount of the solvent is usually from 5 to 50% by weight, and is preferably from 10 to 30% by weight, based on the amount of epihalohydrin. When using the aprotic polar solvent, the amount is usually from 5 to 100% by weight, and preferably from 10 to 60% by weight, based on the amount of epihalohydrin.

The reaction product thus obtained is heated under reduced pressure under conditions of a temperature of 110° C. to 250° C. and a pressure of 10 mmHg or less with or without washing with water, thereby removing epihalohydrin or other solvents added. In order to obtain an epoxy resin containing a small amount of hydrolyzable halogen, it is preferable to securely cyclize a crude epoxy resin obtained after recovering epihalohydrin by dissolving it again in a solvent such as toluene or methyl isobutyl ketone, adding an aqueous solution of an alkali metal hydroxide such as sodium hydroxide or potassium hydroxide and reacting the mixture.

In this case, the amount of the alkali metal hydroxide is usually from 0.5 to 10 mol, and preferably from 1.2 to 5.0 mol, per mol of hydrolyzable chlorine remaining in the crude epoxy resin. The reaction temperature is usually from 50° C. to 120° C., while the reaction time is usually from 0.5 to 3 hours. For the purpose of improving the reaction rate, phase transfer catalysts such as quaternary ammonium salt and crown ether may be added. When using the phase transfer catalyst, the amount is preferably within a range from 0.1 to 3.0% by weight based on the crude epoxy resin.

After the completion of the reaction, the produced salt is removed by filtration or washing with water and the solvent such as toluene or methyl isobutyl ketone is removed by heating under reduced pressure to obtain the desired difunctional epoxy resin (A).

A preferable method used in the steps 1 and 2 is a method of producing a difunctional phenol resin in step 1, charging raw materials such as epihalohydrins without taking out the resulting difunctional phenol resin from a reaction vessel and reacting the mixture in step 2 in view of good productivity.

As described above, the difunctional epoxy resin (A) produced by passing through the steps 1 and 2 is produced as a mixture with the difunctional epoxy resin (A') having a structure wherein a glycidyloxy group is bonded to the aromatic nucleus of the aromatic hydrocarbon group (a1) having a bonding site with the other group in the aromatic nucleus. In the epoxy resin composition of the present invention, the mixture can be used as it is as an epoxy resin component.

As long as the effects of the present invention are not adversely affected, in the epoxy resin composition of the present invention, the epoxy resin mixture can be used in combination with other epoxy resins. When using the flexible difunctional epoxy resin (A) in underfill materials in the field of semiconductor encapsulantsemiconductor encapsulant or in common coatings, liquid epoxy resins such as bisphenol A type epoxy resin, bisphenol F type epoxy resin, and dihydroxynaphthalene type epoxy resin can be used in combination. In the case of applications such as flexible wiring boards, brominated epoxy resins such as brominated phenol novolak type epoxy resin can be used in combination with solid bisphenol A type epoxy resins. The content of these other epoxy resin, which can be used in combination, is preferably less than 60% by weight based on the epoxy resin composition of the present invention. Two or more kinds of these epoxy resins may be used in combination.

It is possible to partially use flexible difunctional epoxy resins (A) in combination for the purpose of imparting flexibility to rigid epoxy resins such as phenol novolak type epoxy resin, cresol novolak type epoxy resin, triphenylmethane type epoxy resin, tetraphenylethane type epoxy resin, dicyclopentadiene-phenol addition reaction type epoxy resin, phenolaralkyl type epoxy resin, naphthol novolak type epoxy resin, naphtholaralkyl type epoxy resin, naphthol-phenol co-condensation novolak type epoxy resin, naphthol-cresol co-condensation novolak type epoxy resin, aromatic hydrocarbon formaldehyde resin-modified phenol resin type epoxy resin, and biphenyl-modified novolak type epoxy resin.

When using the low dielectric difunctional epoxy resin (A), in applications such as semiconductor encapsulantsemiconductor encapsulant, examples thereof include liquid epoxy resins such as bisphenol A type epoxy resin, bisphenol F type epoxy resin, and dihydroxynaphthalene type epoxy resin; and biphenyl type epoxy resin, tetramethylbiphenyl type epoxy resin, phenol novolak type epoxy resin, cresol novolak type epoxy resin, triphenylmethane type epoxy resin, tetraphenylethane type epoxy resin, dicyclopentadiene-phenol addition reaction type epoxy resin, phenolaralkyl type epoxy resin, naphthol novolak type epoxy resin, naphtholaralkyl type epoxy resin, naphthol-phenol co-condensation novolak type epoxy resin, naphthol-cresol co-condensation novolak type epoxy resin, aromatic hydrocarbon formaldehyde resin-modified phenol resin type epoxy resin, and biphenyl-modified novolak type epoxy resin.

When using the low dielectric difunctional epoxy resin (A), in applications such as electrical laminates, brominated epoxy resins such as brominated phenol novolak type epoxy resin can be used in combination with solid bisphenol A type epoxy resins, in addition to the liquid epoxy resins. The content of the epoxy resin, which can be used in combination, is preferably less than 70% by weight, and particularly preferably less than 60% by weight, based on the epoxy resin composition of the present invention. Two or more kinds of these epoxy resins may be used, in combination.

It should be noted that when the difunctional epoxy resin (A) is manufactured and when the above alicyclic structure-containing phenols or xylok-type phenol resins are used as the difunctional phenol compound (a1'), there may be not only difunctional components but also trifunctional components at the same time. As described above, such alicyclic structure-containing phenols or xylok-type phenol resins which have multifunctional components can be reacted as they are with a divinyl ether (a2') of a hydrocarbon compound having an ether bond or a divinyl ether (a3') of the other hydrocarbon compound according to the present invention. Accordingly, in this case, the difunctional epoxy resin (A) which is finally obtained is in a mixture epoxy resins which include a trifunctional or higher components, and such a mixture as it is can be used for various purposes.

As the curing agent (B) in the epoxy resin composition of the present invention, various curing agents for epoxy resin can be used and examples thereof include amine compounds, acid anhydride compounds, amide compounds and phenol compounds.

Examples of the amine compounds include aliphatic polyamines such as ethylenediamine, propylenediamine, butylenediamine, hexamethylenediamine, diethylenetriamine, triethylenetetramine, pentaethylenehexamine, and triethylenetetramine; amines having a high molecular weight such as polypropyleneglycoldiamines having a molecular weight of 200 to 500; aromatic polyamines such as metaxylylenediamine, diaminodiphenylmethane, and phenylenediamine; alicyclic polyamines such as 1,3-bis(aminomethyl)cyclohexane, isophoronediamine, and norbornanediamine; and polyamide resins synthesized from a dimer of dicyandiamine or linolenic acid and ethylenediamine.

Examples of the acid anhydride compounds include phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, and methylhexahydrophthalic anhydride.

Examples of the phenol compounds include phenol novolak resin, cresol novolak resin, aromatic hydrocarbon formaldehyde resin-modified phenol resin, dicyclopentadienephenol addition type resin, phenolaralkyl resin, naphtholaralkyl resin, trimethylolmethane resin, tetraphenylolethane resin, naphthol novolak resin, naphthol-phenol co-condensation novolak resin, naphthol-cresol co-condensation novolak resin, biphenyl-modified phenol resin, and aminotriazine-modified phenol resin, or modified compounds thereof. Examples of the latent catalyst include imidazole, $BF_3$-amine complex, and guanidine derivative.

These curing agents such as amine compounds, acid anhydride compounds, amide compounds and phenol compounds may be used alone, or two or more kinds thereof may be used in combination.

In applications such as use in underfill materials and use in common coatings, the acid anhydride compounds or amine compounds are preferably used. In applications such as adhesives, the amine compounds are preferable. In applications such as flexible wiring boards, the amine compounds, particularly dicyandiamine is preferable in view of operability and curability. In the field in which flexibility of cured articles is demanded, it is preferred that the above amine having a high molecular weight be used as a curing agent. In applications such as semiconductor encapsulant, solid type phenol compounds are preferable in view of heat resistance of the article.

In the epoxy resin composition of the present invention, the amount of the curing agent (B) is preferably controlled so that an equivalent of an active hydrogen group in the curing agent (B) is from 0.7 to 1.5 equivalents per 1 equivalent of epoxy group in the entire epoxy components in the composition because curing proceeds smoothly and good physical properties of a cured article are obtained.

In the epoxy resin composition of the present invention, curing accelerating agents can be appropriately used. Examples of the curing accelerating agent include phosphorus compound, tertiary amine, imidazole, organic acid metal salt, Lewis acid, and amine complex salt. These curing accelerating agents can be used alone, or two or more kinds thereof can be used in combination. In applications such as semiconductor encapsulant, phosphorus compounds such as triphenylphosphine and amine compounds such as DBU are preferable because of excellent curability, heat resistance, electrical characteristics and moisture-resistant reliability.

The epoxy resin composition of the present invention may contain inorganic fillers according to applications. Examples of the inorganic filler include fumed silica, crystalline silica, alumina, silicon nitride, and aluminum hydroxide. When the amount of the inorganic filler is particularly large, fumed silica is preferably used. Although either of crushed fumed silica and spherical fumed silica can be used, spherical fumed silica is preferably used so as to increase the amount of the fumed silica and to suppress an increase in melt viscosity of a molding material. To increase the amount of the spherical silica, size distribution of the spherical silica is preferably adjusted. The higher the filling factor, the better, in view of the flame resistance. The filling factor is particularly preferably at least 65% by weight based on the total amount of the epoxy resin composition. In applications such as conductive pastes, conductive fillers such as silver powder and copper powder can be used.

If necessary, various additives such as silane coupling agents, relesants, pigments, and emulsifiers can be used in the epoxy resin composition of the present invention, and also fire retardants can be used. Examples of the fire retardant include halogen compounds such as decabromodiphenyl ether and tetrabromobisphenol A; phosphorus-containing compounds such as red phosphorus and various phosphate ester compounds; nitrogen-containing compounds such as melamine and its derivatives; and inorganic flame-retardant compounds such as aluminum hydroxide, magnesium hydroxide, zinc borate, and calcium borate.

The epoxy resin composition of the present invention is obtained by uniformly mixing the respective components described above. For example, an epoxy resin composition for coating is prepared by uniformly mixing an epoxy resin, a curing agent and, if necessary, additives such as organic solvents, fillers and pigments using a disperser such as paint shaker.

As described above, a cured article of a composition containing the flexible difunctional epoxy resin (A) is flexible and has toughness and, therefore, it is suited for applications such as underfill materials in the field of semiconductor encapsulantsemiconductor encapsulant and flexible wiring boards in the field of electrical laminates, which have recently been much in demand. Also, a composition containing the low dielectric difunctional epoxy resin (A) yields a cured epoxy resin article which has low dielectric constant and low dielectric dissipation factor and is also excellent in moisture resistance and water resistance. Therefore, these compositions are suited for applications such as semiconductor encapsulantsemiconductor encapsulant, and electrical laminates such as printed circuit boards.

A melt-mixing type epoxy resin composition suited for applications such as underfill materials and semiconductor encapsulant is prepared by uniformly mixing a mixture of the difunctional epoxy resin (A) and the difunctional epoxy resin (A'), a curing agent (B), fillers and, if necessary, other epoxy resins using an extruder, a kneader or a roll. In that case, silica is commonly used as the filler. The amount of the filler is preferably within a range from 30 to 95% by weight based on 100 parts by weight of the epoxy resin composition, and particularly preferably at least 70% by weight, in order to improve flame resistance, moisture resistance, and solder cracking resistance, and to decrease the linear expansion coefficient. An underfill material made of the composition is produced by molding the composition using a casting or transfer molding machine, or an injection molding machine and curing with heating at 80° C. to 200° C. for 2 to 10 hours.

An epoxy resin composition for flexible wiring board materials, other electrical laminates, and CFRP is prepared by dissolving the epoxy resin composition in a solvent such as toluene, xylene, acetone, methyl ethyl ketone, or methyl isobutyl ketone to form a varnish-like composition. In this case, the amount of the solvent is usually from 10 to 70 parts by weight, preferably from 15 to 65 parts by weight, based on 100 parts by weight of the mixture of the epoxy resin composition of the present invention and the solvent. A laminate made of the epoxy resin composition is produced by impregnating a base material such as glass fibers, carbon fibers, polyester fibers, polyamide fibers, alumina fibers, and paper with an epoxy resin composition solution (varnish-like composition) and drying the impregnated base material by heating to form a prepreg, followed by hot press forming.

The epoxy resin composition of the present invention can form cured articles such as molded article, laminate, cast, adhesive, coating film, and film in various applications by a thermocuring process.

EXAMPLES

The present invention will be described in detail by way of examples and comparative examples. In the following Examples and Comparative Examples, parts and percentages are by weight unless otherwise specified.

Example 1

Synthesis of Difunctional Phenol Resin of Structural Formula Pa-1

To a flask equipped with a thermometer and a stirrer, 228 g (1.00 mol) of bisphenol A and 172 g (0.85 mol) of triethylene glycol divinyl ether (manufactured by ISP Co. under the trade name "Rapi-Cure DVE-3") were charged, heated to 120° C. over one hour and then reacted at 120° C. for 6 hours to obtain 400 g of transparent semisolid modified polyhydric phenols (ph-1a).

It was confirmed, from an NMR spectrum ($^{13}C$) shown in FIG. 1 and from the fact that peaks of $M^+=658$ and $M^+=1088$ corresponding to theoretical structures of n=1 and n=2 were obtained in a mass spectrum, that the resulting modified polyhydric phenols (ph-1a) have a structure represented by the above general formula Pa-1. A hydroxyl group equivalent was 364 g/eq, viscosity was 40 mPa·s (150° C., ICI viscometer), and an average value of n in the structural formula P-1 calculated from the hydroxyl group equivalent was 3.21 in the case of the component of $n \geq 1$ and was 11.6 in the case of the component of $n \geq 0$.

Example 2

Synthesis of Difunctional Epoxy Resin of Structural Formula Ea-1

To a flask equipped with a thermometer, a dropping funnel, a cooling tube and a stirrer, 400 g (hydroxyl group equivalent: 364 g/eq) of the modified polyhydric phenols (ph-1a) obtained in Example 1, 925 g (10 mol) of epichlorohydrin and 185 g of n-butanol were charged and dissolved. After heating to 65° C. while purging with nitrogen gas, the pressure was reduced to an azeotropic pressure, and 122 g (1.5 mol) of an aqueous 49% sodium hydroxide solution was added dropwise over 5 hours. Under these conditions, the mixture was continuously stirred for 0.5 hours. The distillate produced during the azeotropic reaction was isolated by a Dean-Stark trap and the aqueous layer was removed, and then the reaction was conducted while returning the organic layer in the reaction. The unreacted epichlorohydrin was distilled off under reduced pressure. The resulting crude epoxy resin was dissolved by adding 1000 g of methyl isobutyl ketone and 100 g of n-butanol. To the solution, 20 g of an aqueous 10% sodium hydroxide solution was added and the reaction was conducted at 80° C. for 2 hours. Then, the reaction solution was washed with 300 g of water three times until the wash was neutral. Water was removed from the reaction system by azeotropy, then precision filtration was carried out, and then the solvent was distilled off under reduced pressure to obtain 457 g of an epoxy resin (ep-1a) of a transparent liquid. It was confirmed, from an NMR spectrum ($^{13}C$) shown in FIG. 2 and from the fact that peaks of $M^+=770$ and $M^+=1200$ corresponding to theoretical structures of n=1 and n=2 were obtained in a mass spectrum, that the epoxy resin (ep-1a) contains an epoxy resin having a structure represented by the general formula Ea-1.

The resulting epoxy resin (ep-1a) is a mixture of a compound of the structural formula Ea-1 wherein n=0 and a compound wherein n=1 or more. The results of GPC revealed that the mixture contains 20% by weight of the compound wherein n=0. An epoxy equivalent of this epoxy resin (ep-1a) was 462 g/eq, viscosity was 12000 mPa·s (25° C., Cannon-Fenske method), and an average value of n in the structural formula Ea-1 calculated from the epoxy equivalent was 2.97 in the case of the component of $n \geq 1$ and was 1.35 in the case of the component of $n \geq 0$.

Example 3

Synthesis of Difunctional Phenol Resin of Structural Formula Pa-1

In the same manner as in Example 1, except that the amount of the triethylene glycol divinyl ether (DVE-3) was replaced by 101 g, modified polyhydric phenols (ph-2a) were obtained. A hydroxyl group equivalent of the resulting modified polyhydric phenols (ph-2a) was 262 g/eq, viscosity was 60 mPa·s (150° C., ICI viscometer), and an average value of n in the structural formula Pa-1 calculated from the hydroxyl group equivalent was 2.21 in the case of the component of $n \geq 1$ and was 0.69 in the case of the component of $n \geq 0$.

Example 4

Synthesis of Difunctional Epoxy Resin of Structural Formula Ea-1

In the same manner as in Example 2, except that modified polyhydric phenols (ph-1a) as the raw material were replaced by 329 g of modified polyhydric phenols (ph-2a), 395 g of an epoxy resin (ep-2a) was obtained. The resulting epoxy resin (ep-2a) was a mixture of a compound of the structural formula Ea-1 wherein n=0 and a compound wherein n=1 or more. The results of GPC revealed that the mixture contains 30% by weight of the compound wherein n=0. An epoxy equivalent of this epoxy resin (ep-2a) was 350 g/eq, viscosity was 90000 mPa·s (25° C., E type viscometer), and an average value of n in the structural formula E-1 calculated from the epoxy equivalent was 2.18 in the case of the component of n≧1 and was 0.84 in the case of the component of n≧0.

Example 5

Synthesis of Difunctional Phenol Resin of Structural Formula Pa-1

In the same manner as in Example 1, except that the amount of the triethylene glycol divinyl ether (DVE-3) was replaced by 192 g, modified polyhydric phenols (ph-3a) were obtained. A hydroxyl group equivalent of the resulting modified polyhydric phenols was 423 g/eq, viscosity was 30 mPa·s (150° C., E ICI viscometer), and an average value of n in the structural formula P-1 calculated from the hydroxyl group equivalent was 3.23 in the case of the component of n≧1 and was 1.43 in the case of the component of n≧0.

Example 6

Synthesis of Difunctional Epoxy Resin of Structural Formula Ea-1

In the same manner as in Example 2, except that modified polyhydric phenols (ph-1a) as the raw material were replaced by 420 g of modified polyhydric phenols (ph-3a), 471 g of an epoxy resin (ep-3a) was obtained. The resulting epoxy resin (ep-3a) was a mixture of a compound of the structural formula E-1 wherein n=0 and a compound wherein n=1 or more. The results of GPC revealed that the mixture contains 15% by weight of the compound wherein n=0. An epoxy equivalent of this epoxy resin (ep-3a) was 526 g/eq, viscosity was 4700 mPa·s (25° C., Cannon-Fenske method), and an average value of n in the structural formula E-1 calculated from the epoxy equivalent was 3.08 in the case of the component of n≧1 and was 1.65 in the case of the component of n≧0.

Synthesis Example 1

Synthesis of Dimer Acid-modified Epoxy Resin

To a flask equipped with a thermometer, a cooling tube and a stirrer, 457 g of a bisphenol A type liquid epoxy resin (manufactured by Dainippon Ink and Chemicals, Inc., under the trade name "EPICLON 850S", epoxy equivalent: 185 g/eq) and 243 g of dimer acid (manufactured by Tsuno Food Industrial Co., Ltd., under the trade name "Tsunodyme 216") were charged and heated to 80° C. while purging with nitrogen gas. Then, 0.14 g of triphenylphosphine (catalyst) was added, and the mixture was reacted at 140° C. for 2 hours to obtain 700 g of a semisolid epoxy resin (ep-4a). The resulting epoxy resin (ep-4a) had a structure wherein a molecular chain is extended by an ester bond as a result of the reaction between carboxyl groups of the dimer acid and epoxy groups, and had an epoxy equivalent of 451 g/eq and a viscosity of 170 mPa·s (150° C., ICI viscometer).

Synthesis Example 2

Synthesis of Sebacic Acid-modified Epoxy Resin

In the same manner as in Synthesis Example 1, except that the dimer acid was replaced by 119 g of sebacic acid (reagent), 576 g of a semisolid epoxy resin (ep-5b) was obtained. The resulting epoxy resin had a structure wherein a molecular chain was extended by an ester bond as a result of the reaction between carboxyl groups of the dimer acid and epoxy groups, and had an epoxy equivalent of 488 g/eq and a viscosity of 290 mPa·s (150° C., ICI viscometer).

Examples 7 to 11 and Comparative Examples 1 to 3

Using three kinds of the epoxy resins (ep-1a) to (ep-3a) synthesized above, and the dimer acid-modified epoxy resin (ep-4a) and the sebacic acid-modified epoxy resin (ep-5a) for comparison obtained in Synthesis Examples 1 and 2 and a 6EO-modified bisphenol A type epoxy resin (ep-6a, manufactured by New Japan Chemical Co., Ltd., under the trade name "Rika Resin BEO-60E", epoxy equivalent: 358 g/eq) as a glycidyl ether of an ethylene oxide adduct (6 mol addition) of bisphenol A, performances were evaluated. As the epoxy resin used in combination with the epoxy resins (ep-1a) and (ep-2a), a bisphenol A type liquid epoxy resin (ep-7a, manufactured by Dainippon Ink and Chemicals, Inc., under the trade name "EPICLON 850S", epoxy equivalent: 188 g/eq) was used.

(Bending resistance) According to the formulation shown in Table 1, an epoxy resin, an amine curing agent (triethylenetetramine) and xylene were uniformly mixed at room temperature. The mixture was charged in an iron dish (65 mm in diameter, 12 mm in height) and heated at 80° C. for 2 hours, then at 125° C. for 2 hours to obtain a 2 mm thick cured article. Using the resulting cured article, a bending test was conducted and the bending resistance was evaluated. The bending test was conducted by bending the cured article by about 180° and it was confirmed whether or not cracking and peeling of the bent portion occur. Samples where cracking of the bent portion was observed were rated "poor", while Samples where cracking of the bent portion was observed were rated "good".

(Adhesion) According to the formulation shown in Table 1, an epoxy resin, an amine curing agent (triethylenetetramine) and xylene were uniformly mixed at room temperature. The mixture was applied on a cold rolled steel sheet(0.8 mm×70 mm×150 mm, SPCC-SB, treated with a water-resistant sand paper (#240)) and heated at 80° C. for 48 hours to obtain a 50 μm thick test piece. Using the resulting test piece, a cross cut test was conducted and the adhesion was evaluated. The cross cut test was conducted according to JIS K5400-6.15 and the results were evaluated by the number of remaining coating sections.

(Moisture resistance) According to the formulation shown in Table 1, an epoxy resin, an amine curing agent (triethylenetetramine) and xylene were uniformly mixed at room temperature. The mixture was charged in an iron dish (65 mm in diameter, 12 mm in height) and heated at 80° C. for 2 hours, then at 125° C. for 2 hours to obtain a 2 mm thick cured article. Using the resulting cured article, a pressure cooker test was conducted and the moisture resistance was evaluated. The pressure cooker test was conducted under the conditions of 121° C., 100% RH and 2 atm for 5 hours. Defects such as cracking, breakage, discoloration, and fogging of the cured article were visually observed. Samples with defects were rated "poor", while samples with no defects were rated "good". Also, a water absorption ratio was calculated from an increase in weight after the pressure cooker test.

(Bondability) According to the formulation shown in Table 1, an epoxy resin, an amine curing agent (triethylenetetramine) and xylene were uniformly mixed at room temperature. The mixture was applied on a cold rolled steel sheet (1.6 mm×25 mm×100 mm, SPCC-SB manufactured by Test-Piece Co., degreased with toluene) and heated at 80° C. for 2 hours, then at 125° C. for 2 hours and 150° C. for 2 hours to obtain a test piece. Using the resulting test piece, a tensile shear test was conducted and the bondability was evaluated. The tensile shear test was conducted according to JIS K6850 and a rupture stress (MPa) was compared. Also an aluminum sheet (1.6 mm×25 mm×100 mm, A1050P manufactured by Test-Piece Co., degreased with toluene) was evaluated in the same manner.

lated by a Dean-Stark trap and the aqueous layer was removed, and then the reaction was conducted while returning the organic layer in the reaction. The unreacted epichlorohydrin was distilled off under reduced pressure. The resulting crude epoxy resin was dissolved by adding 1000 g of methyl isobutyl ketone and 100 g of n-butanol. To the solution, 20 g of an aqueous 10% sodium hydroxide solution was added and the reaction was conducted at 80° C. for 2 hours.

TABLE 1

| | | Examples | | | | | Comparative Examples | | |
|---|---|---|---|---|---|---|---|---|---|
| | | 7 | 8 | 9 | 10 | 11 | 1 | 2 | 3 |
| Formulation | Epoxy resin (ep-1a) | 66.5 | | | 45.5 | | | | |
| | Epoxy resin (ep-2a) | | 65.5 | | | 45.1 | | | |
| | Epoxy resin (ep-3a) | | | 66.9 | | | | | |
| | Epoxy resin (ep-4a) | | | | | | 66.5 | | |
| | Epoxy resin (ep-5a) | | | | | | | 66.7 | |
| | Epoxy resin (ep-6a) | | | | | | | | 65.6 |
| | Epoxy resin (ep-7a) | | | | 19.5 | 19.3 | | | |
| | Triethylenetetramine | 3.5 | 4.5 | 3.1 | 5.0 | 5.6 | 3.5 | 3.3 | 4.4 |
| | Xylene | 30.0 | 30.0 | 30.0 | 30.0 | 30.0 | 30.0 | 30.0 | 30.0 |
| Bending test | | Good | Good | Good | Good | Good | Poor | Poor | Poor |
| Adhesion (cross cut test) | | 100/100 | 100/100 | 100/100 | 100/100 | 100/100 | 90/100 | 87/100 | 100/100 |
| Moisture resistance | | Good | Good | Good | Good | Good | Poor | Poor | Poor |
| Moisture adsorption rate | | 1.85 | 1.77 | 1.90 | 1.72 | 1.68 | 2.10 | 2.08 | 7.20 |
| Bondability | Cold rolled steel sheet (Mpa) | 17.0 | 15.2 | 17.5 | 12.2 | 10.2 | 6.0 | 5.9 | 10.1 |
| | Aluminum sheet (Mpa) | 11.0 | 9.0 | 11.5 | 8.9 | 7.5 | 5.0 | 4.8 | 7.3 |

Example 12

Synthesis of Difunctional Phenol Resin of Structural Formula Pb-1

Figure 3:
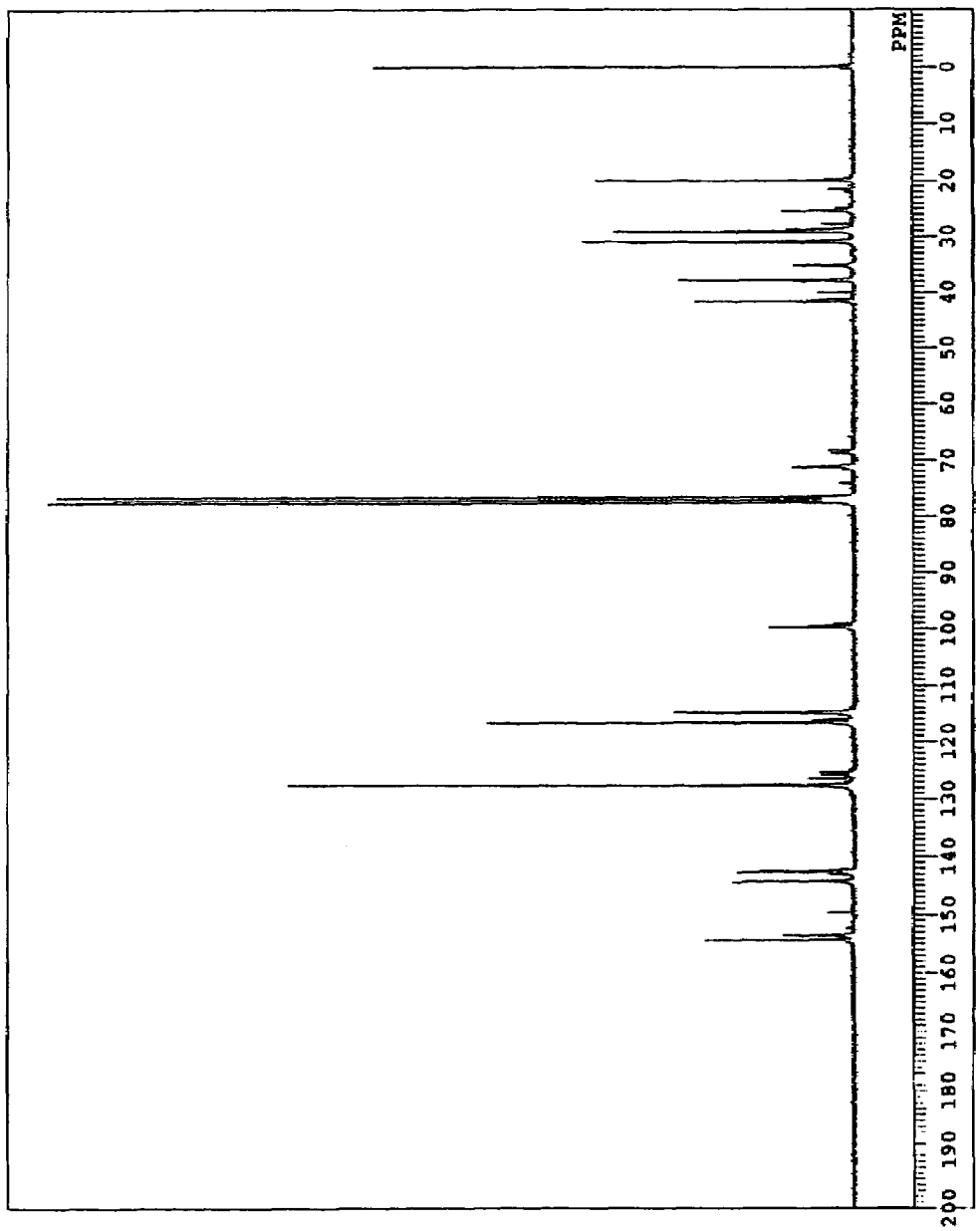
FIG. 3 is a graph showing a $^{13}C$ NMR spectrum of a difunctional phenol resin (ph-1b) obtained in Example 12.
Figure 4:
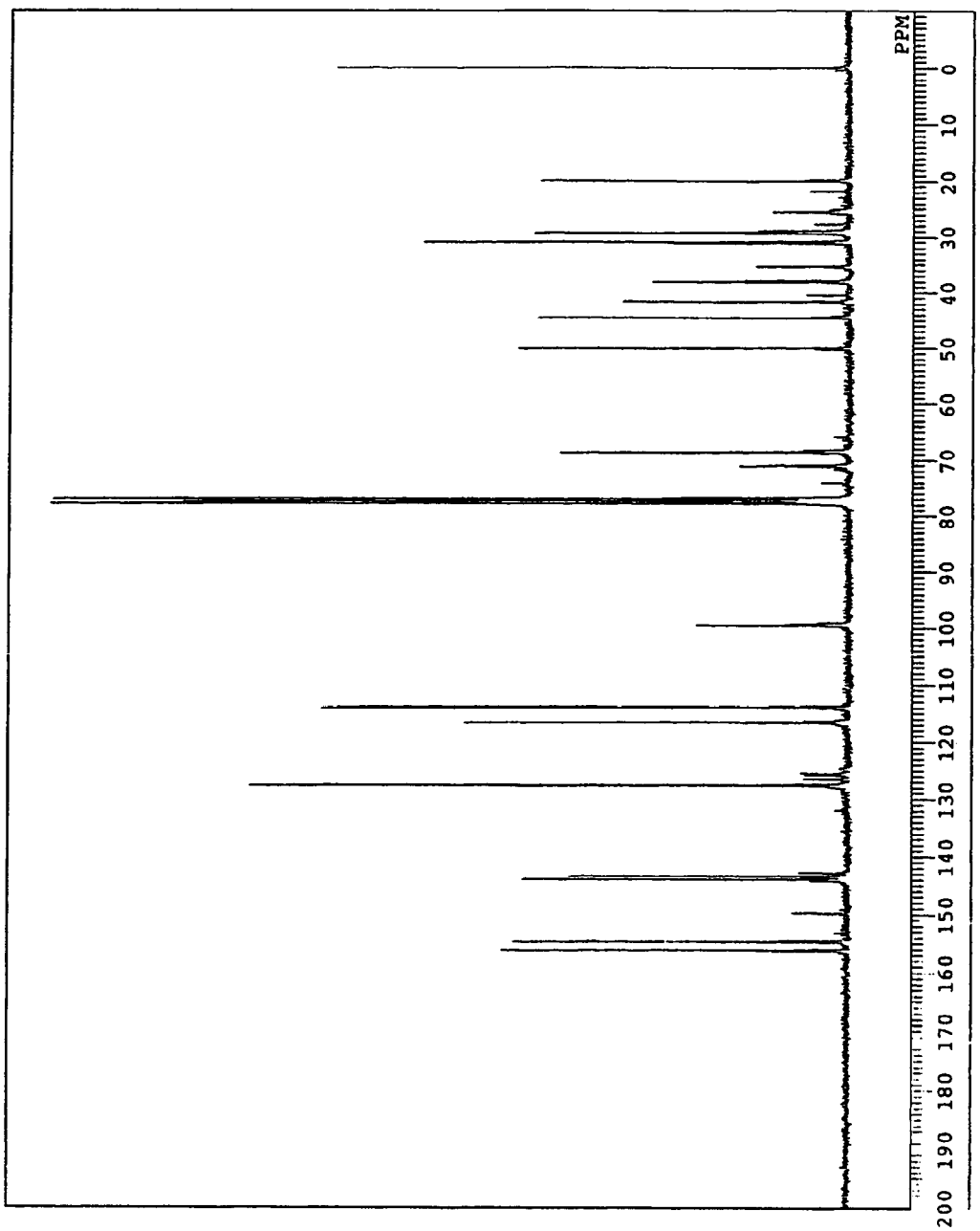
FIG. 4 is a graph showing a $^{13}C$ NMR spectrum of a difunctional epoxy resin (ep-1b) obtained in Example 13.

To a flask equipped with a thermometer and a stirrer, 228 g (1.00 mol) of bisphenol A and 144 g of 1,4-cyclohexanedimethanol divinyl ether (manufactured by Nippon Carbide Industries Co., Inc., under the trade name "CHDVE") were charged, heated to 120° C. over one hour and then reacted at 120° C. for 6 hours to obtain 372 g of a transparent solid phenol resin (ph-1b). It was confirmed, from an NMR spectrum ($^{13}C$) shown in FIG. 3 and from the fact that peaks of $M^+=652$ and $M^+=1076$ corresponding to theoretical structures of n=1 and n=2 were obtained in a mass spectrum, that the resulting resin is the desired difunctional phenol resin having a structure represented by the general formula P-1. A hydroxyl group equivalent was 389 g/eq, viscosity at 150° C. was 140 mPa·s (ICI viscometer), and an average value of n in the structural formula Pb-1 calculated from the hydroxyl group equivalent was 2.66 in the case of the component of $n \geq 1$ and 1.30 in the case of the component of $n \geq 0$.

Example 13

Synthesis of Difunctional Epoxy Resin of Structural Formula Eb-1

To a flask equipped with a thermometer, a dropping funnel, a cooling tube and a stirrer, 372 g of the modified polyhydric phenols (ph-1b) obtained in Example 1, 925 g (10 mol) of epichlorohydrin and 185 g of n-butanol were charged and dissolved. After heating to 65° C. while purging with nitrogen gas, the pressure was reduced to an azeotropic pressure, and 122 g (1.5 mol) of an aqueous 49% sodium hydroxide solution was added dropwise over 5 hours. Under these conditions, the mixture was continuously stirred for 0.5 hours. The distillate produced during the azeotropic reaction was isolated by a Dean-Stark trap and the aqueous layer was removed, and then the reaction was conducted while returning the organic layer in the reaction. The unreacted epichlorohydrin was distilled off under reduced pressure. The resulting crude epoxy resin was dissolved by adding 1000 g of methyl isobutyl ketone and 100 g of n-butanol. To the solution, 20 g of an aqueous 10% sodium hydroxide solution was added and the reaction was conducted at 80° C. for 2 hours.

Then, the reaction solution was washed with 300 g of water three times until the wash was neutral. The system was dehydrated by azeotropy and subjected to precise filtration, and then the solvent was distilled off under reduced pressure to obtain 422 g of an epoxy resin (ep-1b) of a transparent liquid.

Figure 2:
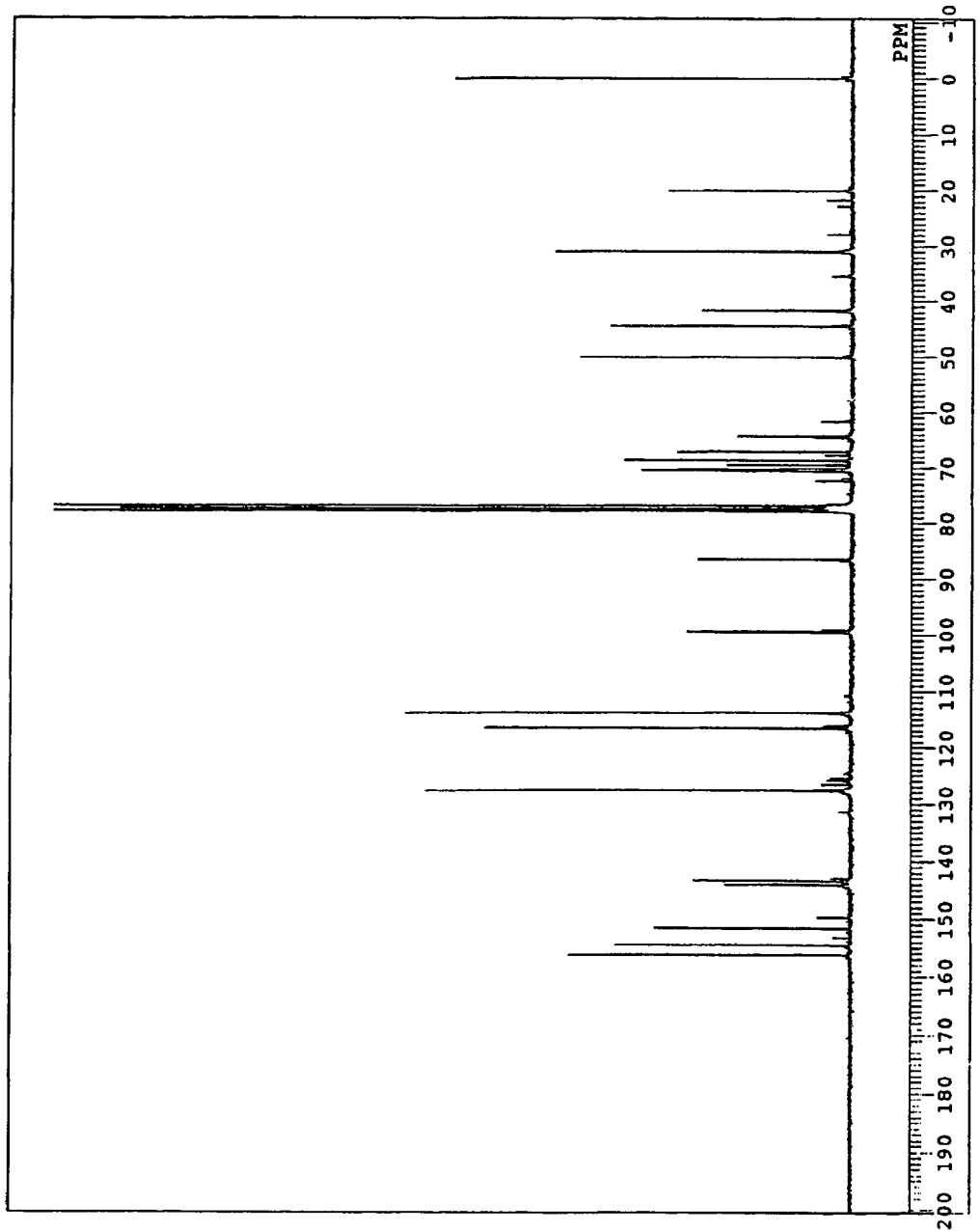
FIG. 2 is a graph showing a $^{13}C$ NMR spectrum of an epoxy resin (ep-1a) obtained in Example 2.

It was confirmed, from an NMR spectrum ($^{13}C$) shown in FIG. 2 and from the fact that peaks of $M^+=764$ and $M^+=1188$ corresponding to theoretical structures of n=1 and n=2 were obtained in a mass spectrum, that the epoxy resin (ep-1b) contains an epoxy resin having a structure represented by the general formula Eb-1.

The resulting epoxy resin (ep-1b) is a mixture of a compound of the structural formula E-1 wherein n=0 and a compound wherein n=1 or more. The results of GPC revealed that the mixture contains 15% by weight of the compound wherein n=0. An epoxy equivalent of this epoxy resin (ep-1b) was 490 g/eq, viscosity at 150° C. was 130 mPa·s (ICI viscometer), and an average value of n in the structural formula Eb-1 calculated from the epoxy equivalent was 2.66 in the case of the component of $n \geq 1$ and 1.51 in the case of the component of $n \geq 0$.

Example 14

Synthesis of Difunctional Phenol Resin of Structural Formula Pb-9

Figure 5:
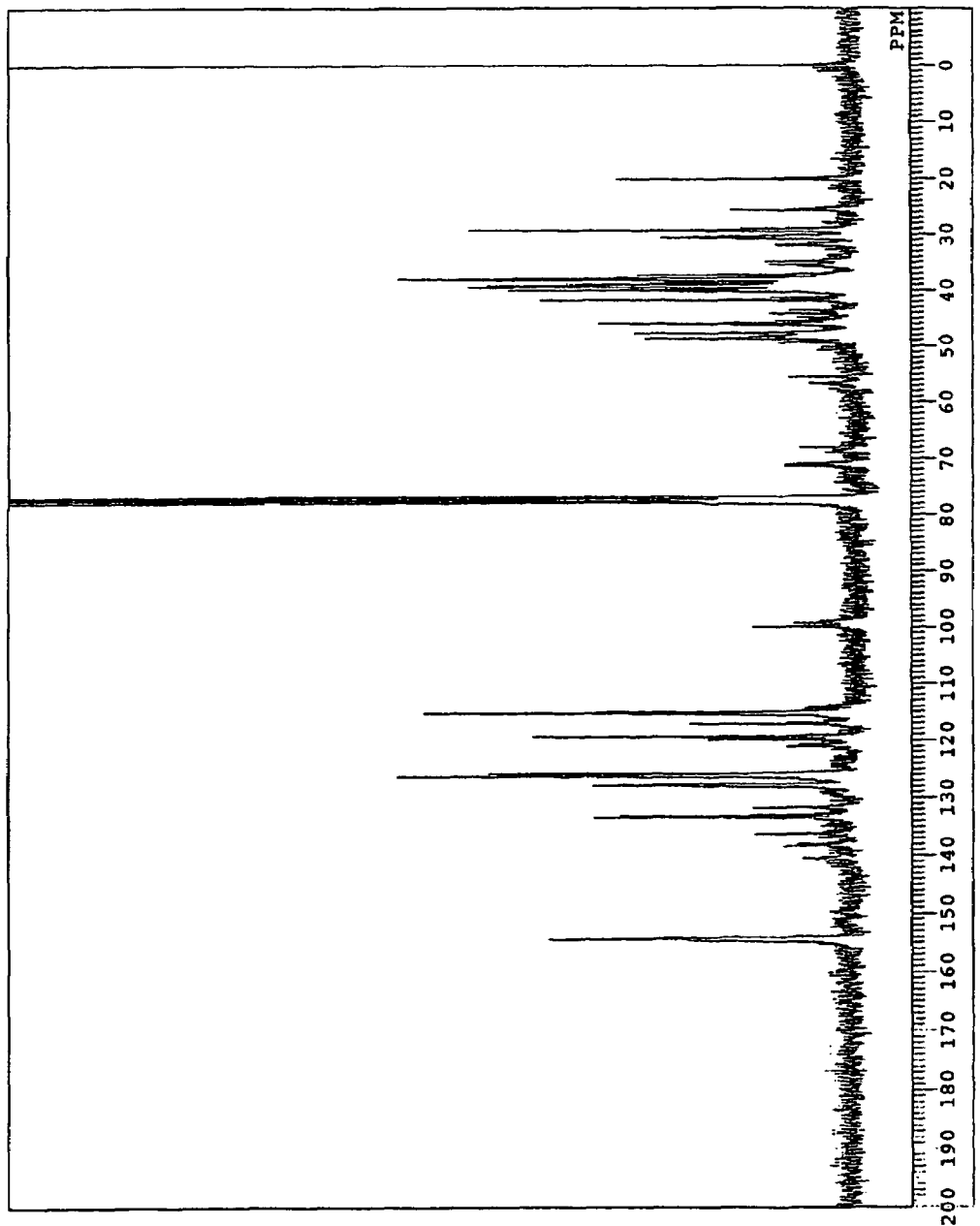
FIG. 5 is a graph showing a $^{13}C$ NMR spectrum of a difunctional phenol resin (ph-2b) obtained in Example 14.

In the same manner as in Example 1, except that bisphenol A as the raw material was replaced by 294 g of a dicyclopentadiene-modified phenol resin (manufactured by Nippon Petrochemicals Co., Ltd., under the trade name "Nisseki Special Phenol Resin DPP-6085") and DVE-3 was replaced by 64 g of CHDVE, 358 g of a brown solid difunctional phenol resin (ph-2b) was obtained. It was confirmed, from an NMR spectrum ($^{13}C$) shown in FIG. 5 and from the fact that peaks of $M^+=836$ and $M^+=1352$ corresponding to theoretical structures of n=1 and n=2 were obtained in a mass spectrum, that the resulting resin is the desired difunctional phenol resin having a structure represented by the general formula Pb-9. A hydroxyl group equivalent was 265 g/eq, viscosity at 150° C. was 710 mPa·s (ICI viscometer), and an average value of n in the structural formula Pb-9 calculated from the hydroxyl group equivalent was 1.37 in the case of the component of n≧1 and 0.41 in the case of the component of n≧0.

Example 15

Synthesis of Difunctional Epoxy Resin of Structural Formula Eb-9

Figure 6:
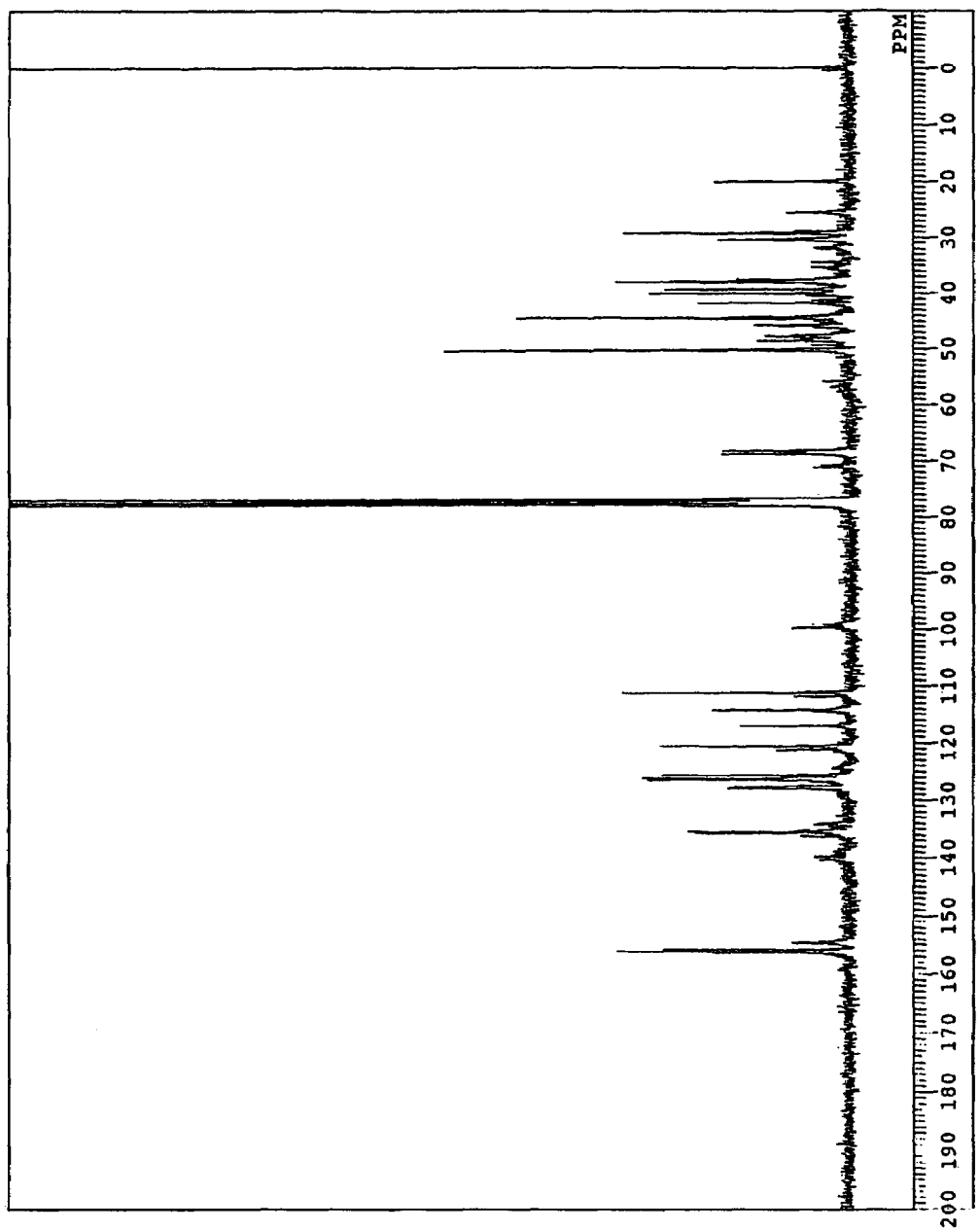
FIG. 6 is a graph showing a $^{13}C$ NMR spectrum of a difunctional epoxy resin (ep-2b) obtained in Example 15.

In the same manner as in Example 2, except that modified polyhydric phenols (ph-1b) as the raw material were replaced by 358 g of modified polyhydric phenols (ph-2b), 429 g of a brown solid difunctional epoxy resin (ep-2b) was obtained. It was confirmed, from an NMR spectrum ($^{13}$C) shown in FIG. 6 and from the fact that peaks of M$^+$=948 and M$^+$=1464 corresponding to theoretical structures of n=1 and n=2 were obtained in a mass spectrum, that the resulting resin is the desired difunctional phenol resin having a structure represented by the general formula Eb-9. The resulting epoxy resin was a mixture of a compound of the structural formula Eb-9 wherein n=0 and a compound wherein n=1 or more. The results of GPC revealed that the mixture contains 35% by weight of the compound wherein n=0. An epoxy equivalent was 353 g/eq, viscosity at 150° C. was 190 mPa·s (ICI viscometer), and an average value of n in the structural formula Eb-9 calculated from the hydroxyl group equivalent was 1.44 in the case of the component of n≧1 and 0.53 in the case of the component of n≧0.

Examples 16 and 17, and Comparative Examples 4 to 7

According to the formulation shown in Table 2, an epoxy resin, a phenol novolak resin curing agent (manufactured by Dainippon Ink and Chemicals, Inc., under the trade name "Phenolite TD-2131", hydroxyl group equivalent: 104 g/eq) and triphenylphosphine (accelerator) were uniformly mixed at 120° C. and then press-formed at a temperature of 150° C. for 10 minutes. Then, the preform was post-cured at 175° C. for 5 hours to obtain a cured article. A test piece having a predetermined size was cut from the cured article and then heat resistance, moisture resistance and dielectric properties-dielectric properties were evaluated by using the resulting test piece. The heat resistance was evaluated by measuring the glass transition temperature using a dynamic viscoelasticity testing machine, while the moisture resistance was evaluated by using an increase in weight after treating by the pressure cooker test (121° C., 100% RH, 2 atm×2 times) as a moisture adsorption ratio. The dielectric propertiesdielectric properties were measured under the conditions of 1 MHz/25° C. using a dielectric constant measuring device (manufactured by Japan E.M. Co., Ltd., "DPMS1000").

The epoxy resins used for comparison include a bisphenol A type liquid epoxy resin (ep-3b, manufactured by Dainippon Ink and Chemicals, Inc., under the trade name "EPICLON 850S", epoxy equivalent: 188 g/eq), a bisphenol A type solid epoxy resin (ep-4b, manufactured by Dainippon Ink and Chemicals, Inc., under the trade name "EPICLON 1055", epoxy equivalent: 477 g/eq), a cresol novolak type epoxy resin (ep-5b, manufactured by Dainippon Ink and Chemicals, Inc., under the trade name "EPICLON N-665-EXP", epoxy equivalent: 203 g/eq), and a dicyclopentadiene type epoxy resin (ep-6b, manufactured by Dainippon Ink and Chemicals, Inc., under the trade name "EPICLON HP-7200H", epoxy equivalent: 279 g/eq).

TABLE 2

| | | Examples | | Comparative Examples | | | |
|---|---|---|---|---|---|---|---|
| | | 16 | 17 | 4 | 5 | 6 | 7 |
| Formulation | Epoxy resin (ep-1b) | 82 | | | | | |
| | Epoxy resin (ep-2b) | | 77 | | | | |
| | Epoxy resin (ep-3b) | | | 64 | | | |
| | Epoxy resin (ep-4b) | | | | 82 | | |
| | Epoxy resin (ep-5b) | | | | | 66 | |
| | Epoxy resin (ep-6b) | | | | | | 73 |
| | TD-2131 | 18 | 23 | 36 | 18 | 34 | 27 |
| | Triphenylphosphine | 1 | 1 | 1 | 1 | 1 | 1 |
| Evaluation | Glass transition temperature (° C.) | 84 | 133 | 134 | 115 | 180 | 174 |
| | Moisture adsorption ratio(%) | 1.03 | 0.57 | 1.6 | 1.89 | 1.05 | 0.59 |
| | Dielectric constant | 3.69 | 3.56 | 4.76 | 4.4 | 4.43 | 3.93 |
| | Dielectric dissipation factor | 00.021 | 0.013 | 0.041 | 0.043 | 0.026 | 0.019 |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An epoxy resin composition comprising:
    a difunctional epoxy resin (A) having a structure wherein:
        an aromatic hydrocarbon group (a1) and a modifying group are bonded via an acetal bond (a4); said modifying group is also bonded to another aromatic hydrocarbon group (a1) via another acetal bond (a4); said modifying group consisting of a hydrocarbon-based group featuring at least one ether group (a2) or a hydrocarbon group (a3); said aromatic hydrocarbon group (a1) having a bonding site in an aromatic nucleus thereof; and wherein two aromatic hydrocarbon groups (a1) feature a glycidyloxy group directly bonded to said bonding site; and
    a curing agent (B).

2. The epoxy resin composition according to claim 1, wherein the hydrocarbon-based group featuring at least one ether group (a2) is an alkyleneoxyalkylene group (a2-1).

3. The epoxy resin composition according to claim 1, wherein the hydrocarbon group (a3) is a straight-chain alkylene group (a3-1) having 2 to 15 carbon atoms.

4. The epoxy resin composition according to claim 1, wherein the hydrocarbon group (a3) is an aliphatic cyclic hydrocarbon group (a3-2).

5. The epoxy resin composition according to any one of claims 1 to 4, which further contains a difunctional epoxy resin (A') having a structure comprising an aromatic hydrocarbon group (a1) having two bonding sites in an aromatic nucleus thereof and wherein a glycidyloxy group is bonded to each of said bonding sites.

6. The epoxy resin composition according to claim 2 or 3, which further contains a difunctional epoxy resin (A') having a structure comprising an aromatic hydrocarbon group (a1) having two bonding sites in an aromatic nucleus thereof and wherein a glycidyloxy group is bonded to each of said bonding sites; wherein the difunctional epoxy resin (A) and the difunctional epoxy resin (A') are provided in a ratio, (A)/(A'), of from 90/10 to 60/40 by weight.

7. The epoxy resin composition according to claim 2 or 3, which further contains a difunctional epoxy resin (A') having a structure comprising an aromatic hydrocarbon group (a1) having two bonding sites in an aromatic nucleus thereof and wherein a glycidyloxy group is bonded to each of said bonding sites; wherein (A) and (A') are provided as a mixture, said mixture having an epoxy equivalent of 250 to 1000 g/equivalent and a viscosity at 25° C. of 2000 to 150000 mPa·s.

8. The epoxy resin composition according to claim 4, which further contains a difunctional epoxy resin (A') having a structure comprising an aromatic hydrocarbon group (a1) having two bonding sites in an aromatic nucleus thereof and wherein a glycidyloxy group is bonded to each of said bonding sites; wherein (A) and (A') are provided as a mixture, said mixture having an epoxy equivalent of 300 to 1000 g/equivalent and a viscosity at 150° C. of 0.1 to 1.0 Pa·s.

* * * * *